US011173645B2

(12) United States Patent
Cai et al.

(10) Patent No.: US 11,173,645 B2
(45) Date of Patent: Nov. 16, 2021

(54) APPARATUSES AND METHODS FOR APPLYING RADIUS FILLER

(71) Applicant: The Boeing Company, Chicago, IL (US)

(72) Inventors: Fei Cai, Edmonds, WA (US); Weidong Song, Woodinville, WA (US); Jamie J. Langabeer, Everett, WA (US); Steven A. Solack, Nunica, MI (US); Adam DeVries, Grand Rapids, MI (US); Kyler J. Kamyszek, Grandville, MI (US)

(73) Assignee: The Boeing Company, Chicago, IL (US)

( * ) Notice: Subject to any disclaimer, the term of this patent is extended or adjusted under 35 U.S.C. 154(b) by 698 days.

(21) Appl. No.: 15/948,831

(22) Filed: Apr. 9, 2018

(65) Prior Publication Data
US 2019/0308356 A1 Oct. 10, 2019

(51) Int. Cl.
B29C 48/92 (2019.01)
B29C 48/155 (2019.01)
(Continued)

(52) U.S. Cl.
CPC ............ B29C 48/92 (2019.02); B05C 5/0216 (2013.01); B05C 11/1005 (2013.01); B05C 11/1021 (2013.01); B29C 48/12 (2019.02); B29C 48/155 (2019.02); B05C 5/0241 (2013.01); B05C 7/02 (2013.01); B05C 11/021 (2013.01); B05C 11/025 (2013.01); B29C 2948/9258 (2019.02);
(Continued)

(58) Field of Classification Search
None
See application file for complete search history.

(56) References Cited

U.S. PATENT DOCUMENTS

2010/0140834 A1 6/2010 Sherwood et al.
2017/0028606 A1* 2/2017 Song ............... B29C 48/155
(Continued)

OTHER PUBLICATIONS

Extended European Search Report dated Sep. 27, 2019 in corresponding European Application No. 19163871.7, 8 pages.
(Continued)

Primary Examiner — Monica A Huson
Assistant Examiner — Kelsey C Grace
(74) Attorney, Agent, or Firm — MH2 Technology Law Group LLP

(57) ABSTRACT

An apparatus for depositing a radius filler, made of a homogeneous material, into a groove, formed in a workpiece comprises a chassis, first means for extruding the radius filler along an extrusion axis, second means for providing the homogeneous material to the first means, and third means for compacting the radius filler in the groove. The apparatus also comprises a first sensor configured to provide first-sensor output. The apparatus further comprises a controller, operatively coupled to the first means, the second means, and the first sensor. Based on the first-sensor output, the controller is configured to determine the first geometric characteristics of the groove. In addition, based on the first geometric characteristics, the controller is configured to control second geometric characteristics of the radius filler, extruded by the first means, as the tool center point is moved relative to the groove.

20 Claims, 12 Drawing Sheets

(51) Int. Cl.
    *B29C 48/12*     (2019.01)
    *B05C 5/02*     (2006.01)
    *B05C 11/10*     (2006.01)
    *B05C 11/02*     (2006.01)
    *B05C 7/02*     (2006.01)

(52) U.S. Cl.
    CPC ............... *B29C 2948/92114* (2019.02); *B29C 2948/92447* (2019.02); *B29C 2948/92571* (2019.02)

(56) References Cited

U.S. PATENT DOCUMENTS

| | | |
|---|---|---|
| 2017/0028633 A1 | 2/2017 | Evans et al. |
| 2017/0028638 A1 | 2/2017 | Evans et al. |
| 2017/0197346 A1 | 7/2017 | Song et al. |
| 2017/0197350 A1 | 7/2017 | Song |
| 2017/0368732 A1 | 12/2017 | Song et al. |
| 2018/0071949 A1* | 3/2018 | Giles ................... B28B 17/0081 |

OTHER PUBLICATIONS

Communication pursuant to Article 94(3) EPC dated May 10, 2021 in in corresponding European Application No. 19163871.7, 4 pages.

\* cited by examiner

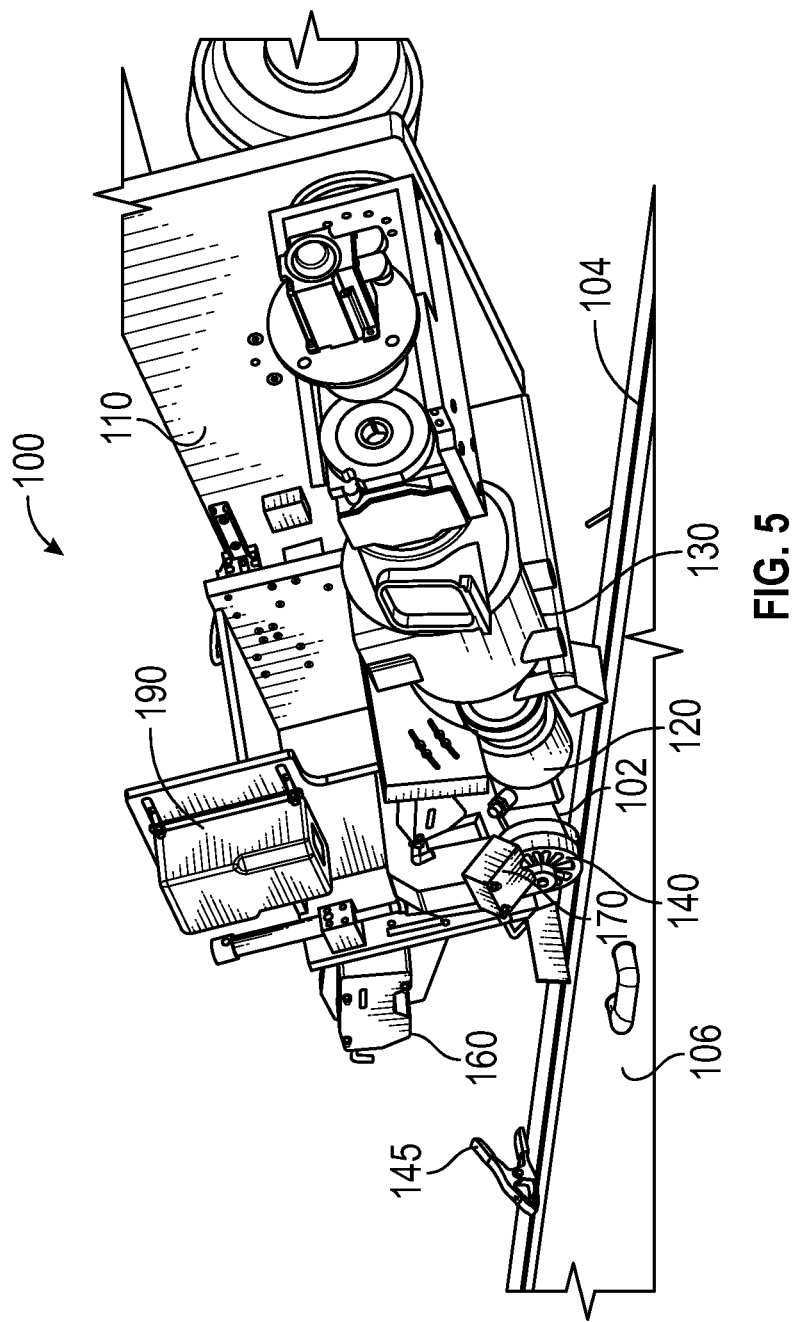

APPARATUSES AND METHODS FOR APPLYING RADIUS FILLER

TECHNICAL FIELD

The present disclosure relates to systems and methods for filling a groove in a workpiece with a homogeneous material.

BACKGROUND

Interfaces between composite structures, such as spars and/or ribs, often comprise grooves, filled with radius fillers or "noodles", made of composite material. However, conventional radius-filler application techniques are slow and inefficient.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an apparatus for depositing a radius filler, made of a homogeneous material, into a groove, formed in a workpiece. The apparatus comprises a chassis, movable relative to the groove. The apparatus also comprises first means for extruding the radius filler along an extrusion axis. The apparatus further comprises a tool center point, associated with the first means. The apparatus additionally comprises second means for providing the homogeneous material to the first means. The second means is attached to the chassis and the first means is attached to the second means. The apparatus also comprises third means for compacting the radius filler in the groove. The third means is attached to the chassis. The apparatus additionally comprises a first sensor, attached to the chassis and configured to provide first-sensor output, representative of first geometric characteristics of the groove along at least a portion of the length of the groove before the radius filler is deposited into at least the portion of the length of the groove. The apparatus further comprises a controller, operatively coupled to the first means, the second means, and the first sensor. Based on the first-sensor output, the controller is configured to determine the first geometric characteristics of the groove. Based on the first geometric characteristics, the controller is also configured to control second geometric characteristics of the radius filler, extruded by the first means, as the tool center point is moved relative to the groove.

The apparatus implements an in-situ radius-filler manufacturing and deposition technique, which addresses problems, associated with excessive manufacturing lead time, high cost, as well as complex fabrication, material-handling, and large-footprint requirements of conventional radius-filler installations. The apparatus is used to produce, in-situ, and install a radius filler, having the desired length and a cross-sectional shape, which is dynamically adjusted to correspond to the cross-sectional shape of the groove, into which the radius filler is deposited.

Another example of the subject matter according to the invention relates to a method of depositing a radius filler, made of a homogeneous material, into a groove, formed in a workpiece and having a length. The method comprises moving, relative the groove, a tool center point, associated with first means for extruding the radius filler along an extrusion axis. The method also comprises using a first sensor that is attached to a chassis, supporting the first means, to provide first-sensor output, representative of first geometric characteristics of the groove along at least a portion of the length of the groove before the radius filler is deposited into at least the portion of the length of the groove. The method additionally comprises causing the first means to extrude the radius filler along the extrusion axis while controlling second geometric characteristics of the radius filler based on the first geometric characteristics. The method further comprises at least partially compacting the radius filler, extruded by the first means, in the groove.

The method relates to an in-situ radius-filler manufacturing and deposition technique, which addresses problems, associated with excessive manufacturing lead time, high cost, as well as complex fabrication, material-handling, and large-footprint requirements of conventional radius-filler installations. The method is used to produce, in-situ, and install a radius filler, having the desired length and a cross-sectional shape, which is dynamically adjusted to correspond to the cross-sectional shape of the groove, into which the radius filler is deposited.

BRIEF DESCRIPTION OF THE DRAWINGS

Figure 1:
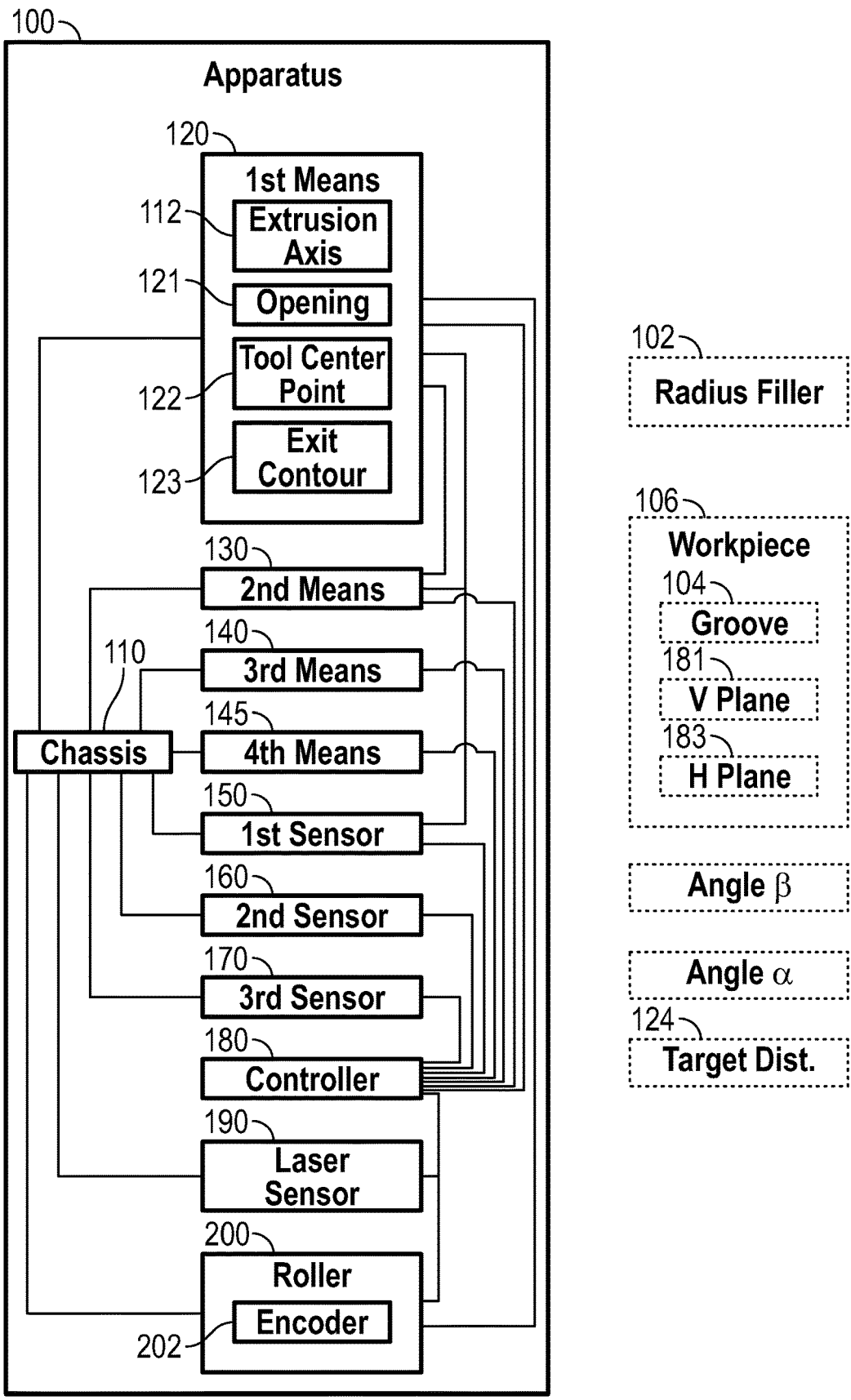
Figure 2:
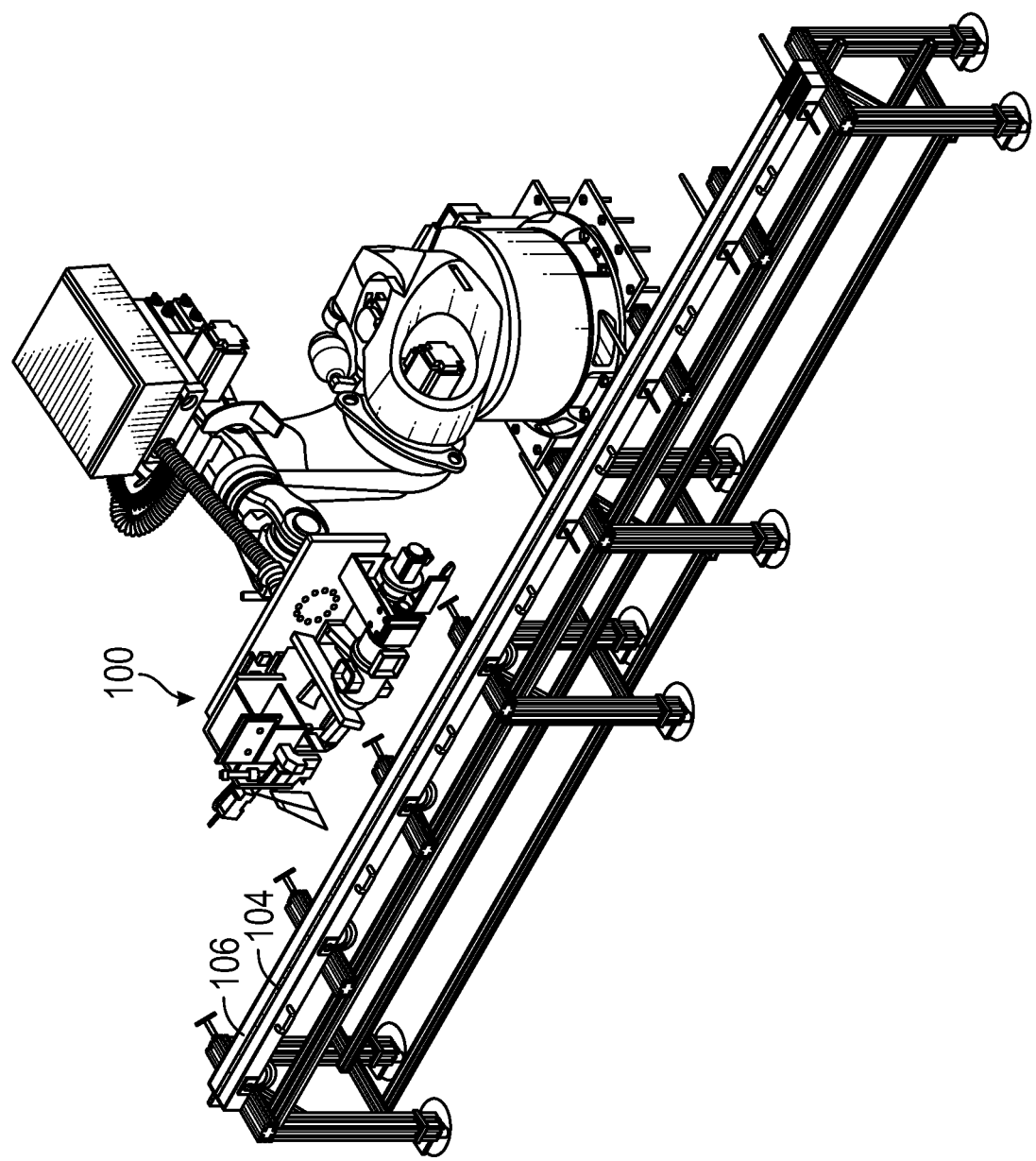
Figure 3:
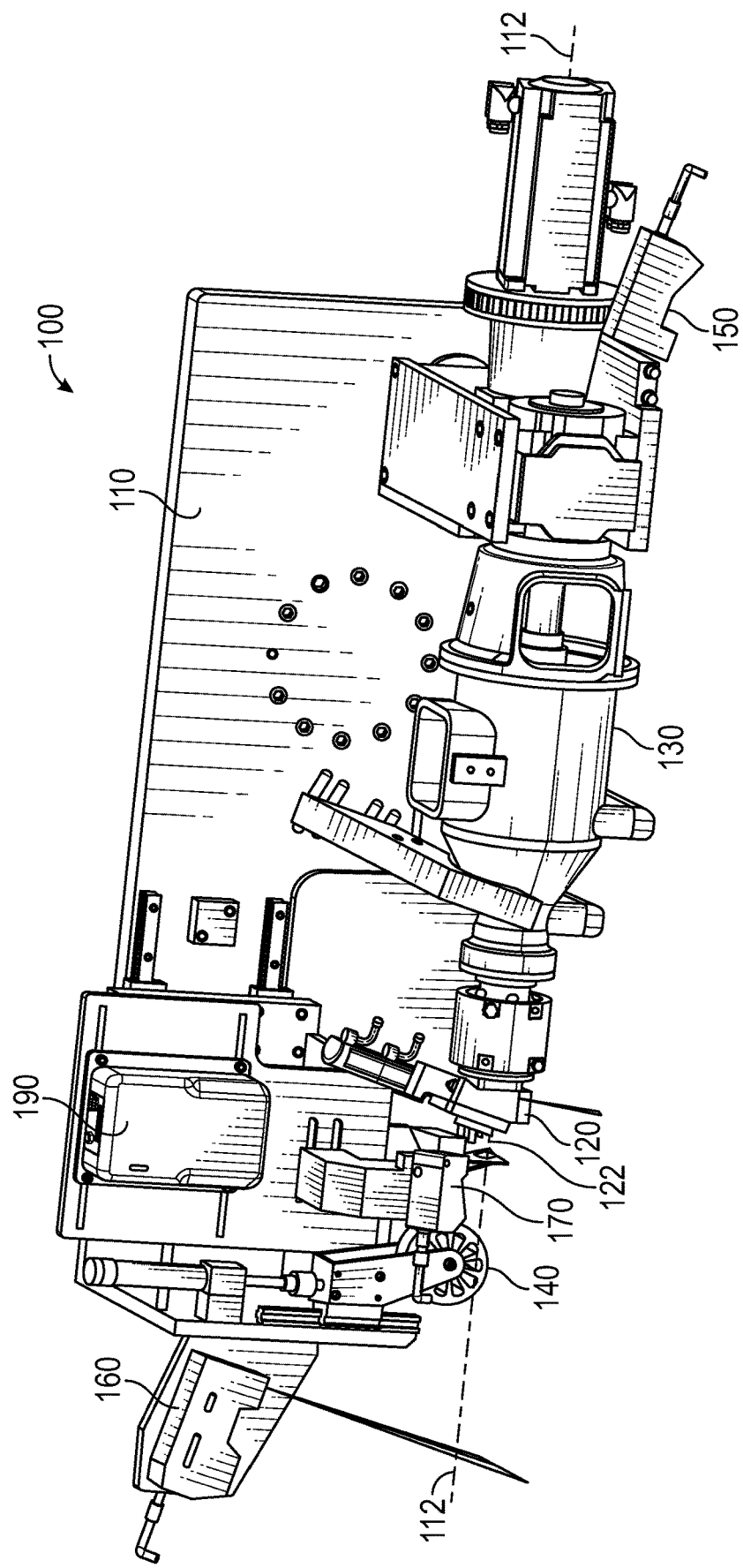
Figure 4:
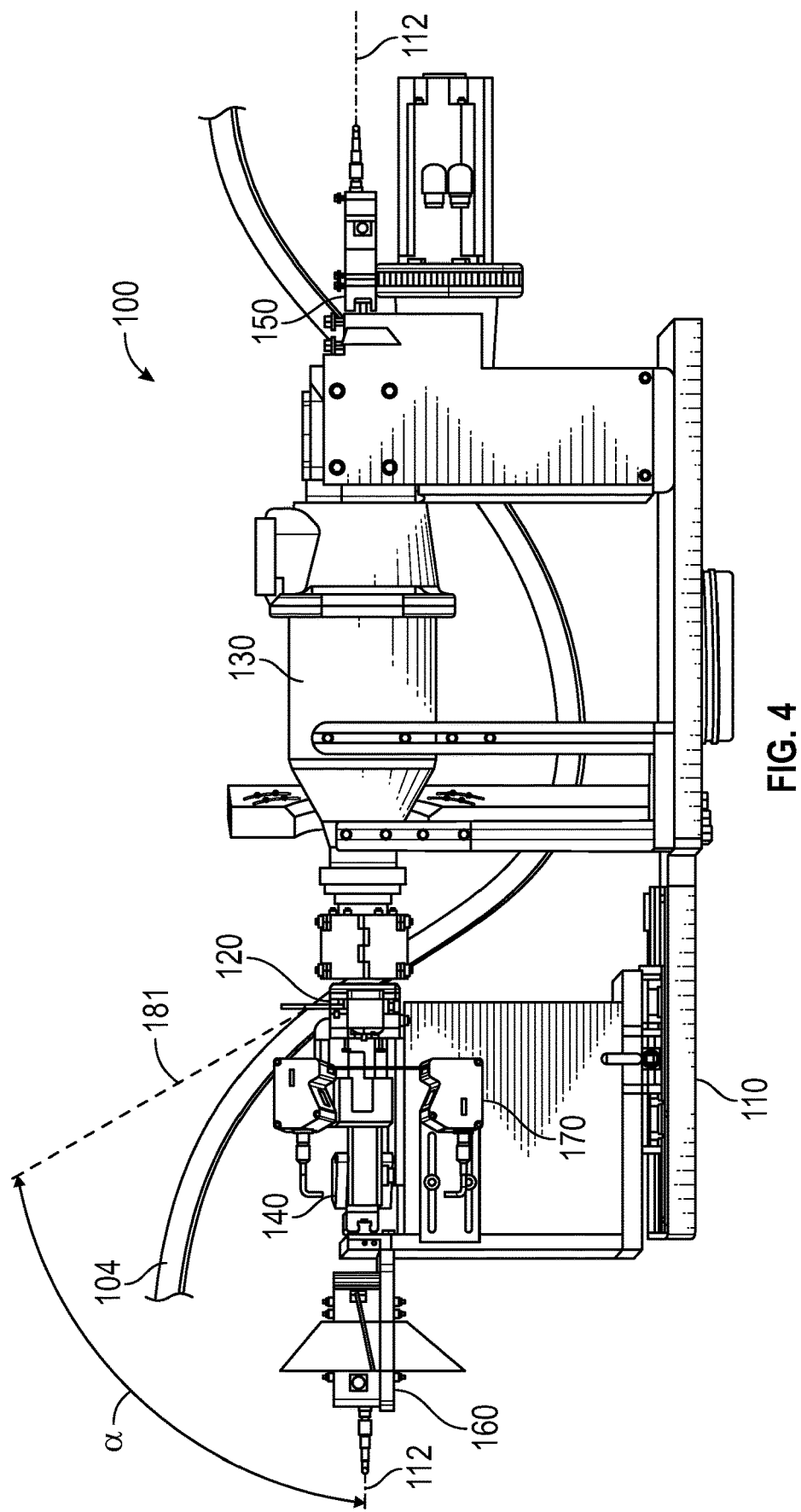
Figure 6A:
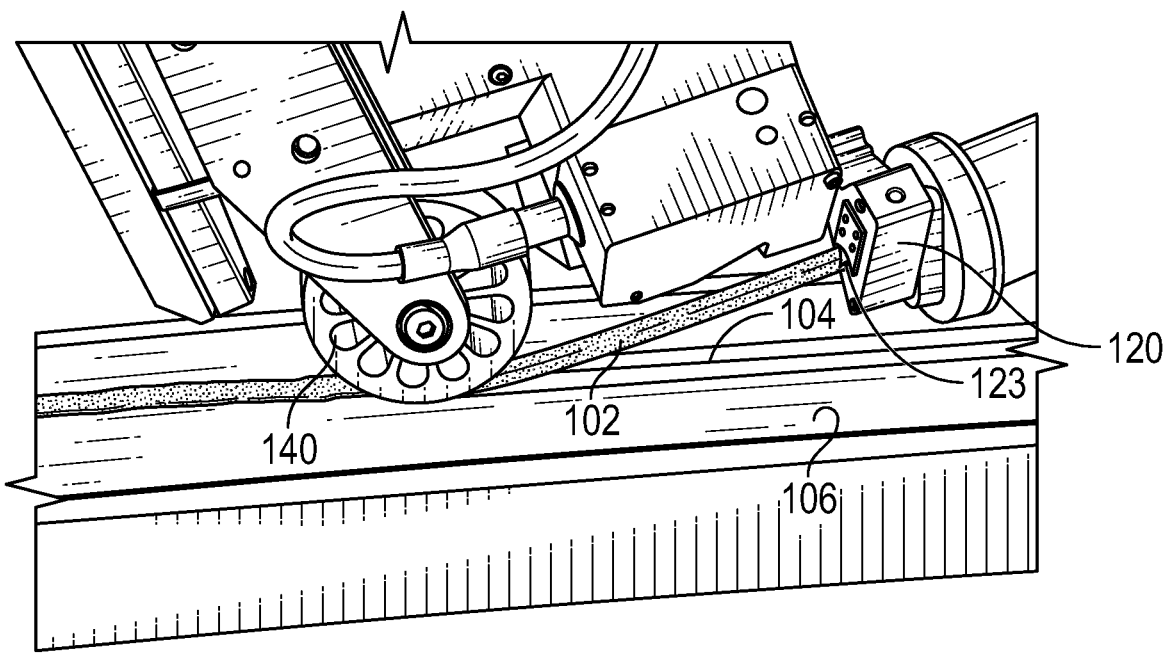
Figure 6B:
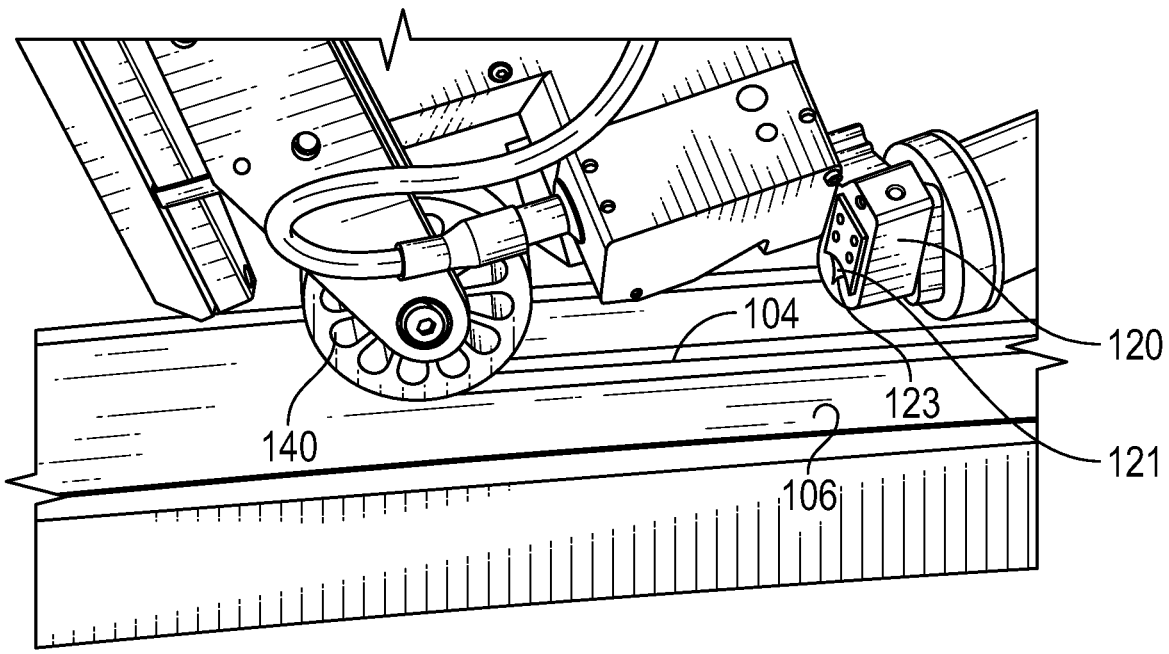
Figure 7:
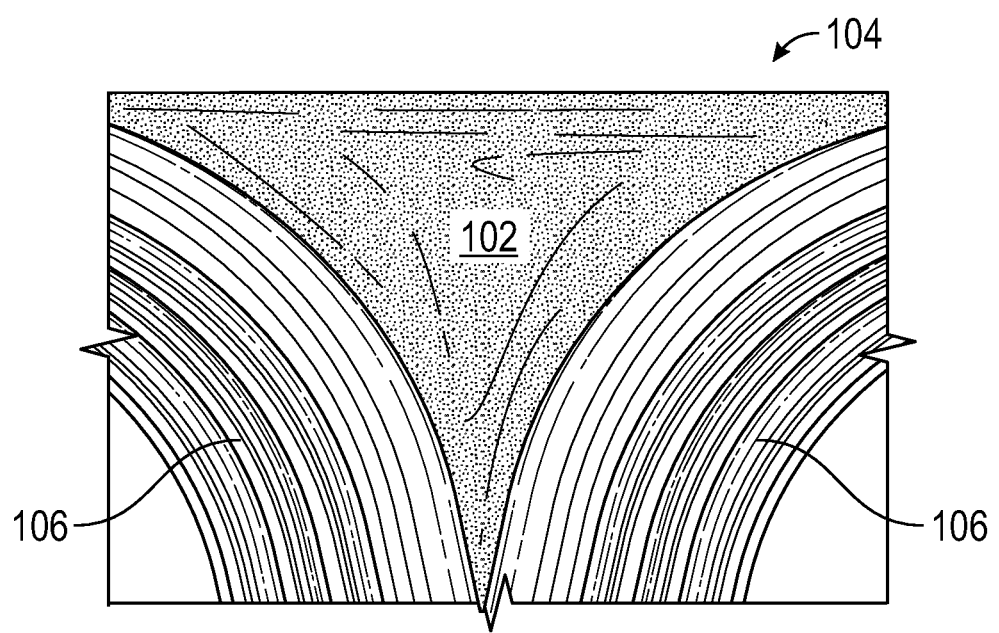
Figure 8:
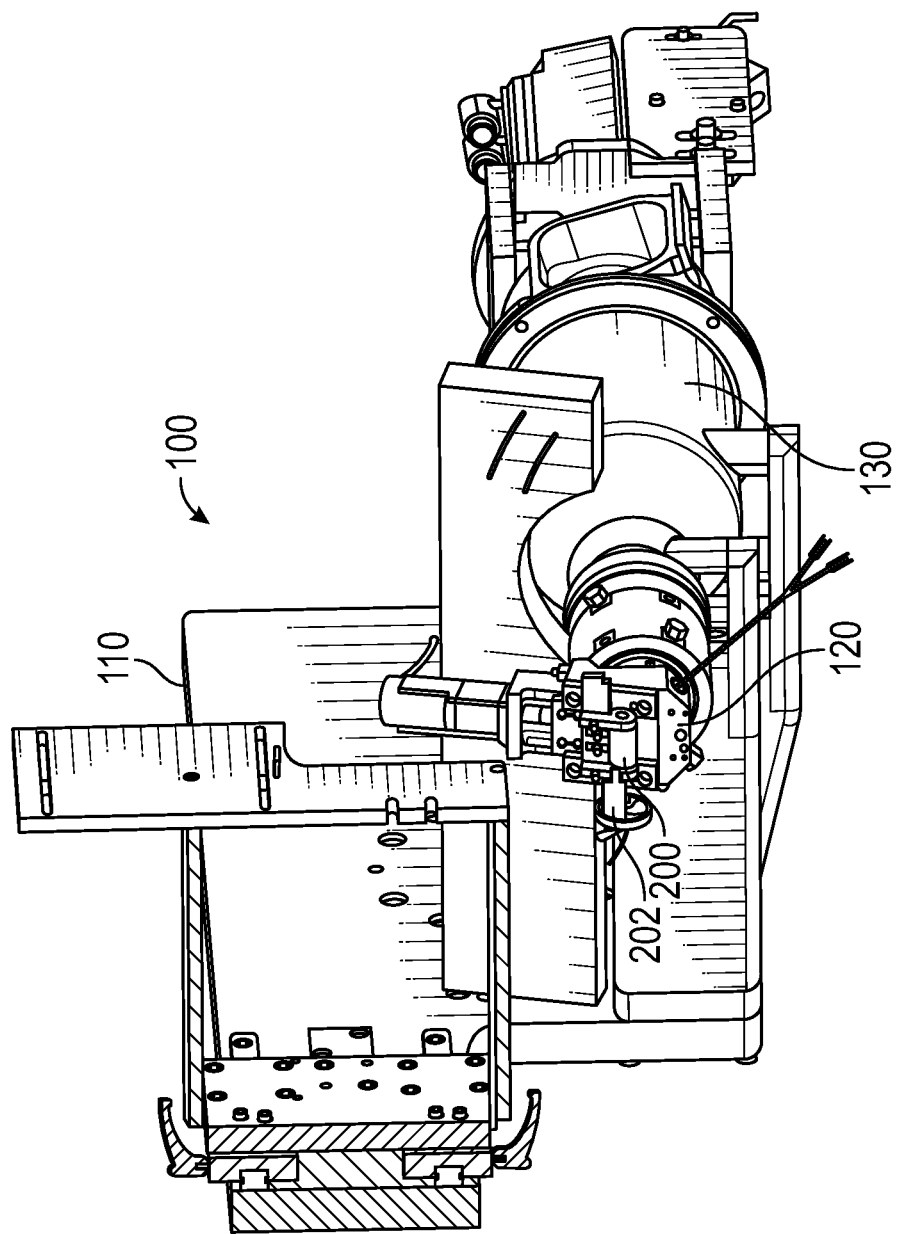
Figure 9:
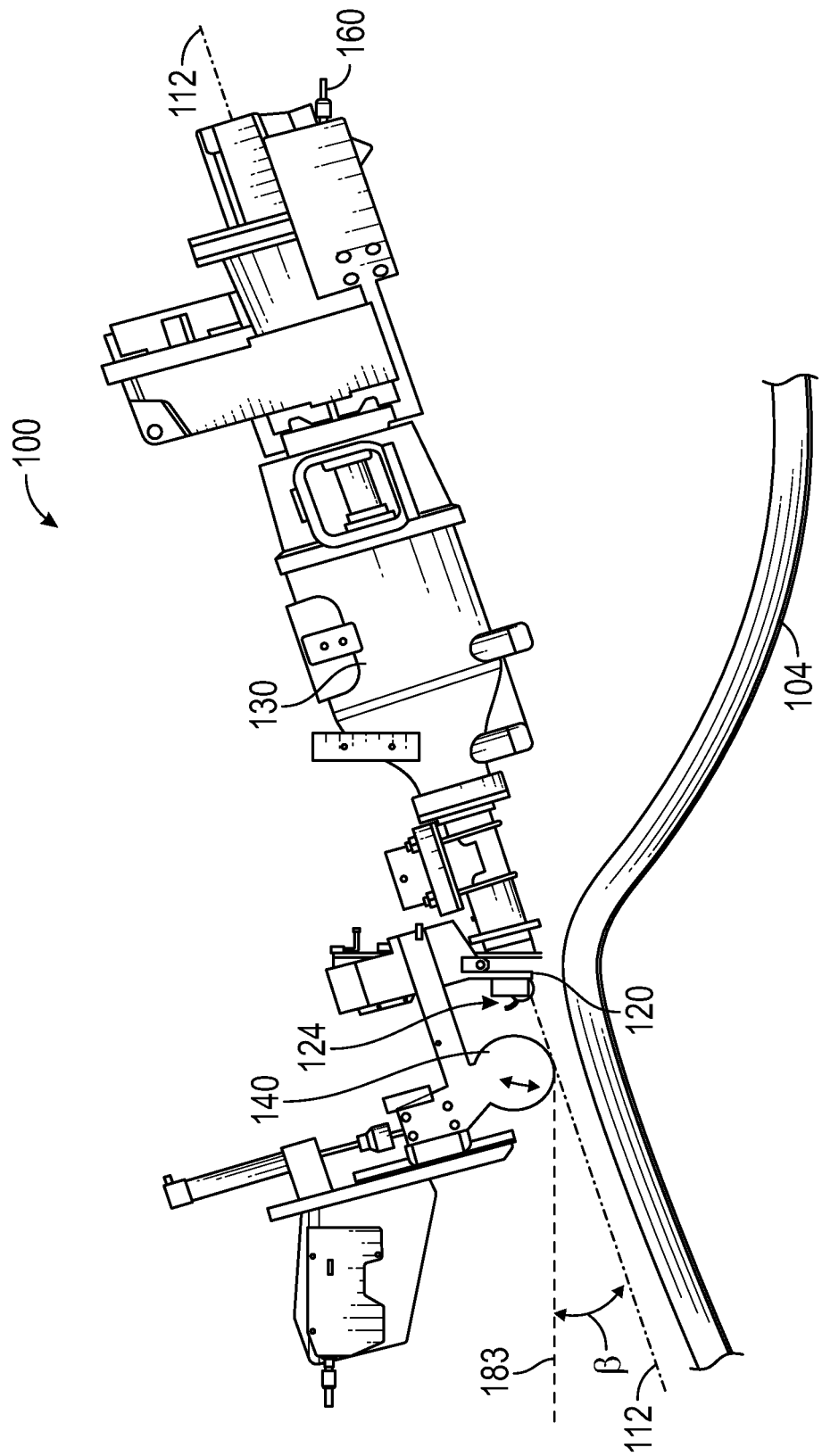
Figure 10A:
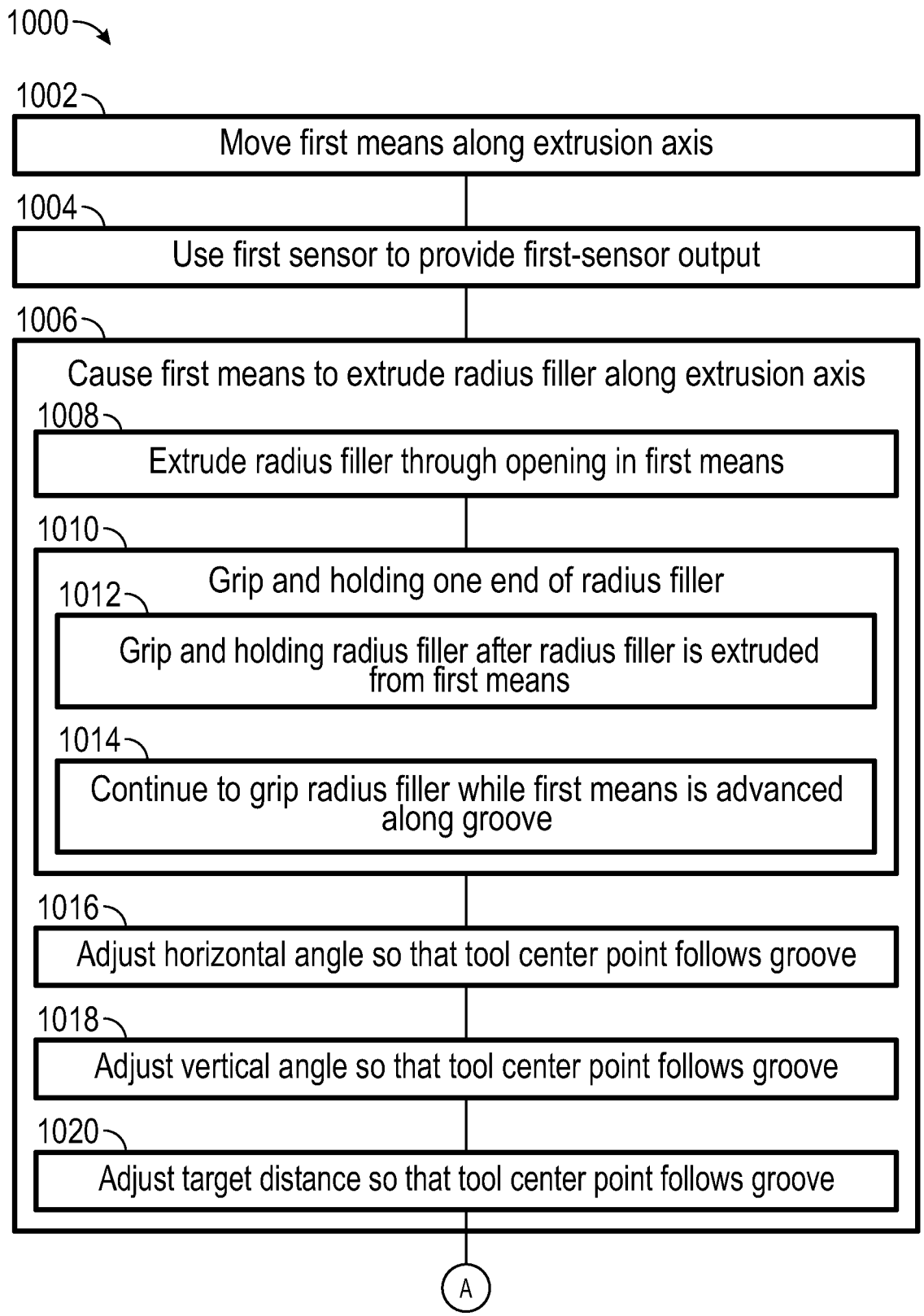
Figure 10B:
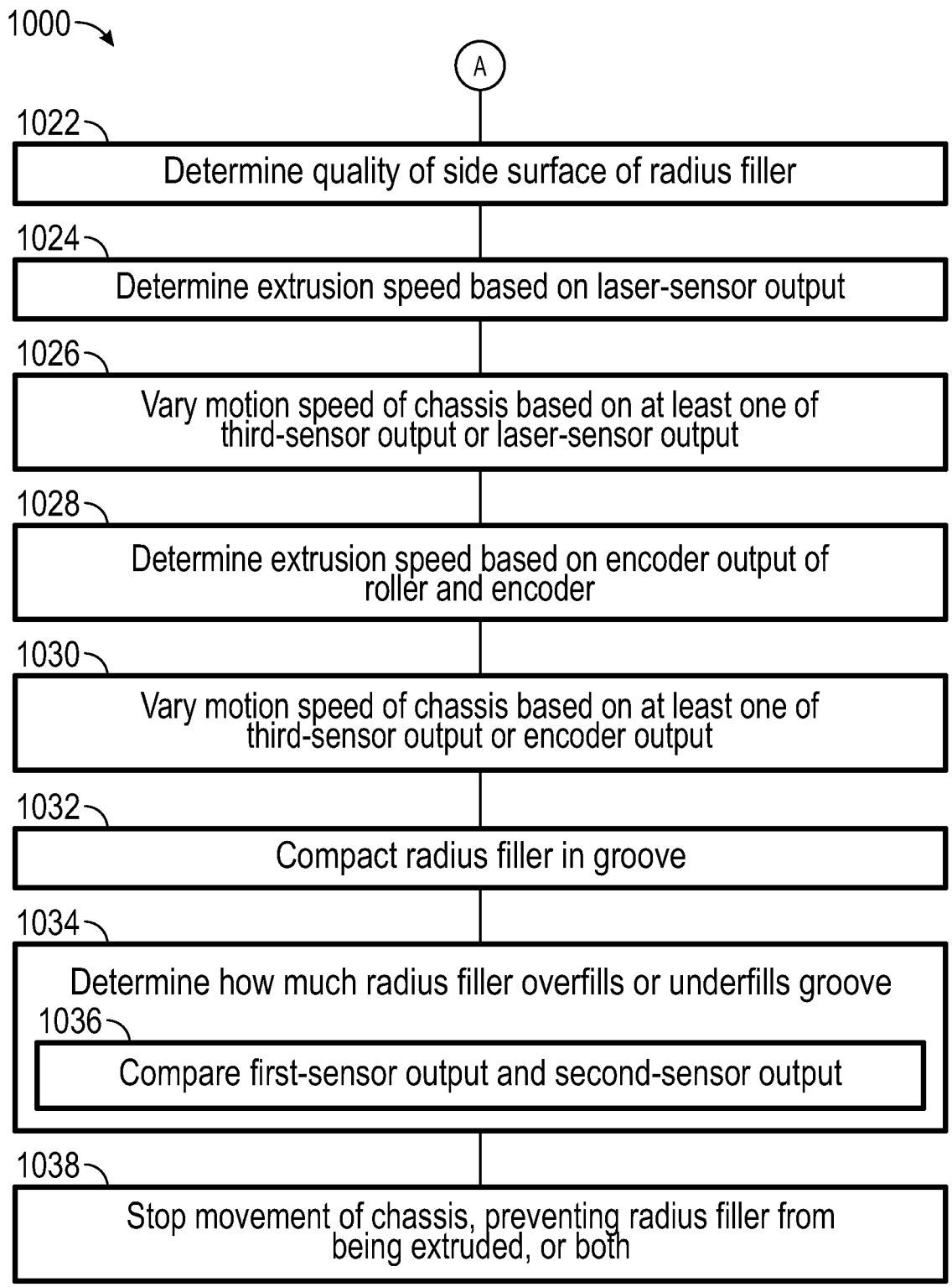
Figure 11:
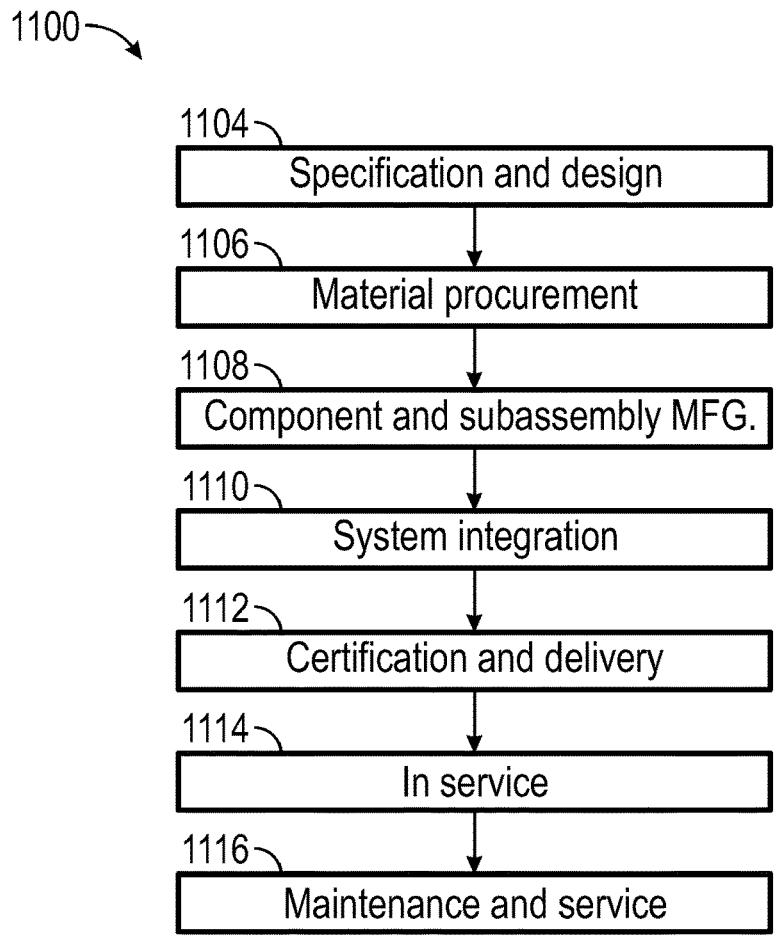
Figure 12:
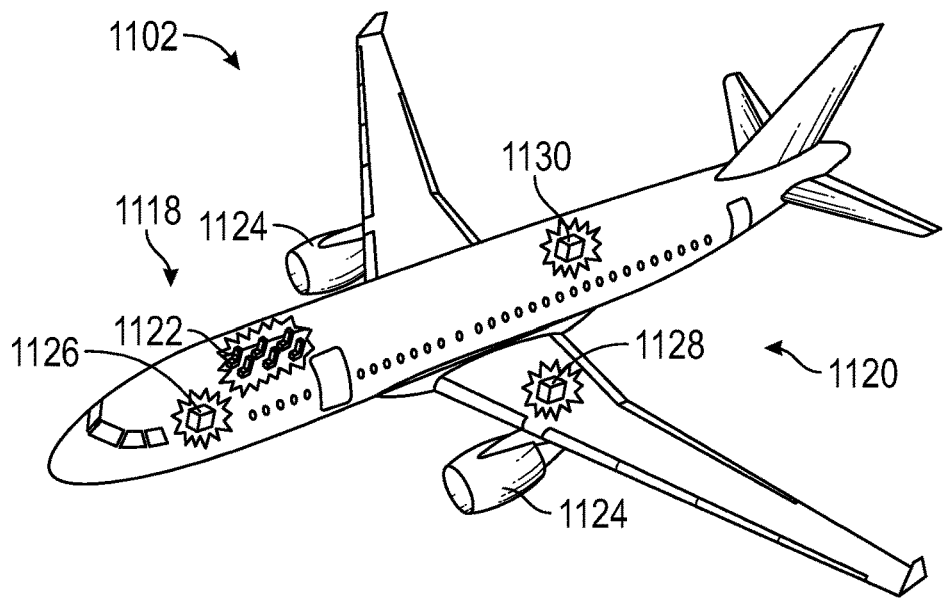

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram of an apparatus for depositing a radius filler into a groove formed in a workpiece, according to one or more examples of the present disclosure;

FIG. 2 is a schematic, perspective view of the apparatus of FIG. 1, according to one or more examples of the present disclosure;

FIG. 3 is a schematic, perspective view of the apparatus of FIG. 1, according to one or more examples of the present disclosure;

FIG. 4 is a schematic, plan view of the apparatus of FIG. 1, according to one or more examples of the present disclosure;

FIG. 5 is a schematic, perspective view of the apparatus of FIG. 1, depositing the radius filler into the groove formed in the workpiece, according to one or more examples of the present disclosure;

FIG. 6A is a schematic, perspective view of a portion of the apparatus of FIG. 1, illustrating deposition of the radius filler into the groove formed in the workpiece, according to one or more examples of the present disclosure;

FIG. 6B is a schematic, perspective view of the portion of the apparatus of FIG. 6A, with the radius filler omitted;

FIG. 7 is a schematic, sectional view of the radius filler in the groove, according to one or more examples of the present disclosure;

FIG. 8 is a schematic, perspective view of the apparatus of FIG. 1, according to one or more examples of the present disclosure;

FIG. 9 is a schematic, side elevation view of the apparatus of FIG. 1, according to one or more examples of the present disclosure;

FIGS. 10A and 10B, collectively, are a block diagram of a method of depositing the radius filler into the groove, formed in the workpiece, utilizing the apparatus of FIG. 1, according to one or more examples of the present disclosure;

FIG. 11 is a block diagram of an aircraft production and service methodology; and FIG. 12 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 10A, 10B, and 11, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 10A, 10B, and 11 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-9, apparatus 100 for depositing radius filler 102, made of a homogeneous material, into groove 104, formed in workpiece 106 is disclosed. Apparatus 100 comprises chassis 110, movable relative to groove 104. Apparatus 100 also comprises first means 120 for extruding radius filler 102 along extrusion axis 112. Apparatus 100 additionally comprises tool center point 122, associated with first means 120. Apparatus 100 further comprises second means 130 for providing the homogeneous material to first means 120. Second means 130 is attached to chassis 110 and first means 120 is attached to second means 130. Additionally, apparatus 100 comprises third means 140 for compacting radius filler 102 in groove 104. Third means 140 is attached to chassis 110. Apparatus 100 also comprises first sensor 150, attached to chassis 110 and configured to provide first-sensor output, representative of first geometric characteristics of groove 104 along at least a portion of the length of groove 104 before radius filler 102 is deposited into at least the portion of the length of groove 104. Apparatus 100 further comprises controller 180, operatively coupled to first means 120, second means 130, and first sensor 150. Based on the first-sensor output, controller 180 is configured to determine the first geometric characteristics of groove 104. Based on the first geometric characteristics, controller 180 is also configured to control second geometric characteristics of radius filler 102, extruded by first means 120, as tool center point 122 is moved relative to groove 104. The preceding subject matter of this paragraph characterizes example 1 of the present disclosure.

Apparatus 100 implements an in-situ radius-filler manufacturing and deposition technique, which addresses problems, associated with excessive manufacturing lead time, high cost, as well as complex fabrication, material-handling, and large-footprint requirements of conventional radius-filler installations. Apparatus 100 is used to produce, in-situ, and install radius filler 102, having the desired length and a cross-sectional shape, which is dynamically adjusted to correspond to the cross-sectional shape of groove 104, into which radius filler 102 is deposited.

Chassis 110 supports at least some of the components of apparatus 100. In one example, first means 120 is an adjustable nozzle that extrudes radius filler 102. The adjustable nozzle is configured to vary the size of its opening to control the cross-sectional area of radius filler 102 as radius filler 102 is being extruded. The adjustable nozzle comprises a gate, configured to move across the opening to selectively occlude the opening to adjust a profile of radius filler 102 as radius filler 102 is being extruded.

Tool center point 122 is a reference point that is fixed with respect to first means 120. In one implementation, tool center point 122 is at the outlet of first means 120, through which radius filler 102 is extruded. In one example, second means 130 includes an extruder that heats and/or stores the homogeneous material and provides the homogeneous material to first means 120. In one example, extruder is a VPM-7 Power Wedger auger-extruder made by Peter Pugger Mfg., Inc. of Ukiah, Calif. Extruder can be a hydraulic or mechanical screw auger extruder. In one example, third means 140 includes a roller that rolls along workpiece 106, trailing first means 120, and compacts radius filler 102 in groove 104. In another example, third means 140 includes a flat surface that is pulled along workpiece 106, trailing first means 120, and slides over radius filler 102 to compact radius filler 102 in groove 104. First sensor 150 leads first means 120 as apparatus 100 moves along groove 104. First sensor 150 measures the shape, cross-sectional area, and/or path of groove 104. Controller 180 is configured to receive and process the first-sensor output and to control (e.g., maintain or modify the second geometric characteristics of radius filler 102, which includes a cross-sectional shape of radius filler 102, a speed at which radius filler 102 is extruded, or the like). In one example, controller 180 is a Compact GuardLogix programmable logic controller made by Rockwell Automation, Inc. of Milwaukee, Wis.

In one example, radius filler 102 is a stringer noodle, made of a thermoset resin that is reinforced with chopped fibers. In at least one implementation, radius filler 102 is not laminated. In one example, radius filler 102 has a length as long as groove 104, which can be up to about 110 feet or even longer. In one example, radius filler 102 and workpiece 106 are co-cured together after radius filler 102 is deposited in groove 104.

Groove 104 can be a uniform groove. For example, groove 104 can be in a straight line and/or have a constant cross-sectional area along the length of groove 104. In another implementation, groove 104 can be a non-uniform groove. For example, groove 104 can bend, wind, or zig-sag in a horizontal plane or a vertical plane and/or the cross-sectional area can vary along the length of groove 104.

In one example, second means 130 includes a heated barrel that stores and heats the homogeneous material to produce radius filler 102. In one example, first sensor 150 includes one or more profilometers that provide signals for measuring the cross-sectional area of groove 104. In one example, profilometer(s) are LJ-V7000 series profilometer(s) made by Keyence of Itasca, Ill. In one example, first means 120 and/or second means 130 includes a closed-loop heat control, and the temperature is set at about 120° F.+/−5° F.

When the process begins, apparatus 100 is positioned at a predetermined location such that one end of groove 104 is within the field of view of first sensor 150. Once apparatus 100 is in the starting position, the first-sensor output is used to adjust or maintain the position of apparatus 100 (e.g., first means 120) relative to groove 104. More particularly, first-sensor output is used to guide the position of apparatus 100 by continuously taking X, Y, Z measurements and making adjustments based upon horizontal angle $\alpha$, vertical angle $\beta$, and target distance 124 between first means 120 and groove 104.

Referring generally to FIG. 1 and particularly to, e.g., FIGS. 6A, 6B, and 7, the first geometric characteristics of groove 104 comprise a cross-sectional area of groove 104. The preceding subject matter of this paragraph characterizes example 2 of the present disclosure, wherein example 2 also includes the subject matter according to example 1, above.

In some cases, cross-sectional area of groove 104 varies along groove 104. By monitoring such variations, the second geometric characteristics of radius filler 102 can be dynamically adjusted to match the variations in the groove 104. For example, the size of the opening of the adjustable nozzle (first means 120) is adjusted as the gate moves across the opening to dynamically adjust the second geometric characteristics of radius filler 102.

Referring generally to FIG. 1 and particularly to, e.g., FIGS. 6A, 6B, and 7, the second geometric characteristics of radius filler 102 comprise a cross-sectional area of radius filler 102. The preceding subject matter of this paragraph characterizes example 3 of the present disclosure, wherein example 3 also includes the subject matter according to example 1 or 2, above.

In some cases, cross-sectional area of groove 104 varies along groove 104. By monitoring such variations, the second geometric characteristics of the radius filler 102 can be dynamically adjusted to match the variations in the groove 104. For example, the size of the opening of the adjustable nozzle (first means 120) is adjusted as the gate moves across the opening to dynamically adjust the second geometric characteristics of radius filler 102.

Referring generally to FIG. 1 and particularly to, e.g., FIGS. 3-7, when groove 104, observed in a plan view, comprises a plan-view non-linear portion, controller 180 is also configured, based on the first-sensor output, to adjust horizontal angle $\alpha$ between a horizontal projection of extrusion axis 112 and vertical plane 181, tangent to groove 104, so that tool center point 122 follows groove 104 as chassis 110 is moved relative to groove 104. The preceding subject matter of this paragraph characterizes example 4 of the present disclosure, wherein example 4 also includes the subject matter according to any one of examples 1 to 3, above.

Adjusting or maintaining horizontal angle $\alpha$ allows radius filler 102 to be positioned within groove 104 even when groove 104 changes in shape, size, and/or direction. For example, if groove 104 undulates horizontally, controller 180 adjusts horizontal angle $\alpha$ so that tool center point 122 follows groove 104.

The first-sensor output is also used to calculate pitch offset (e.g., angular orientation change of first means 120 to maintain a predetermined optimum target distance 124 and horizontal angle $\alpha$ between first means 120 and groove 104). Horizontal angle $\alpha$ measures from about 1° to about 5°, from about 1° to about 15°, or from about 1° to about 30°. In at least one implementation, the first-sensor output is used in conjunction with the second-sensor output to accomplish this.

Vertical plane 181 is a virtual reference plane. As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities may be defined.

In one example, the point of tangency is the intersection of extrusion axis 112 and the medial (central) longitudinal axis of groove 104. In another implementation, the point of tangency is the intersection of extrusion axis 112 and another axis, such as a central longitudinal axis of groove 104.

Referring generally to FIG. 1 and particularly to, e.g., FIGS. 3-7 and 9, apparatus 100 also comprises second sensor 160, attached to chassis 110 and configured to provide second-sensor output, representative of third geometric characteristics of radius filler 102 in groove 104 along at least a portion of the length of groove 104 after third means 140 compacts radius filler 102 in groove 104. The preceding subject matter of this paragraph characterizes example 5 of the present disclosure, wherein example 5 also includes the subject matter according to any one of examples 1 to 4, above.

Second sensor 160 provides quality assurance of radius filler 102 in groove 104 (e.g., to ensure that radius filler 102 properly fills or slightly overfills groove 104).

Second sensor 160 is used for quality assurance. In one example, second sensor 160 includes one or more profilometers that lag third means 140. In one example, profilometer(s) are LJ-V7000 series profilometer(s) made by Keyence of Itasca, Ill. The third geometric characteristics include a crown height of radius filler 102 (e.g., height of the radius filler 102 relative to groove 104) after radius filler 102 is deposited in groove 104. Additionally or alternatively, the third geometric characteristics include a width of radius filler 102 after radius filler 102 is deposited in groove 104. Additionally or alternatively, the third geometric characteristics include overfill or underfill cross-sectional area.

Referring generally to FIG. 1 and particularly to, e.g., FIGS. 6A, 6B, and 7, the third geometric characteristics comprise at least one of: (1) a maximum width of radius filler 102 after third means 140 compacts radius filler 102 in groove 104; or (2) a difference between a height of groove 104 and a height of radius filler 102. The preceding subject matter of this paragraph characterizes example 6 of the present disclosure, wherein example 6 also includes the subject matter according to example 5, above.

Images from the first-sensor output are compared with images from the second-sensor output to ensure that radius filler 102 properly fills or slightly overfills groove 104.

The third geometric characteristics include a crown height of radius filler 102 (e.g., height of radius filler 102 relative to the groove 104) after radius filler 102 is deposited in groove 104. Additionally or alternatively, the third geometric characteristics include a width of radius filler 102 after radius filler 102 is deposited in groove 104. Additionally or alternatively, the third geometric characteristics include overfill or underfill cross-sectional area.

Referring generally to FIG. 1 and particularly to, e.g., FIGS. 6A, 6B, and 7, controller 180 is also configured, by making a comparison between the first-sensor output and the second-sensor output, to determine how much radius filler 102 overfills or underfills groove 104. The preceding subject matter of this paragraph characterizes example 7 of the present disclosure, wherein example 7 also includes the subject matter according to example 5 or 6, above.

Images from the first-sensor output are compared with images from the second-sensor output to ensure that radius filler 102 properly fills or slightly overfills groove 104.

The comparison includes overlaying the second-sensor data over the first-sensor data. In one implementation, an overfill from about 1% to about 20% or from about 5% to about 15% is desired.

Referring generally to FIG. 1 and particularly to, e.g., FIGS. 5-7, controller 180 is also configured, responsive to a fault condition, corresponding to radius filler 102 overfilling or underfilling groove 104 by a predetermined amount and identified by making the comparison between the first-sensor output and the second-sensor output, to at least one of: discontinue movement of chassis 110 relative to groove 104 and extrusion of radius filler 102 along extrusion axis 112 or store a location of the fault condition along groove 104. The preceding subject matter of this paragraph characterizes example 8 of the present disclosure, wherein example 8 also includes the subject matter according to example 7, above.

If a fault/error is detected, controller 180 stops part or all of the process so that the fault/error can be analyzed and not propagated along the length of groove 104. In one implementation, an overfill from about 1% to about 20% or from about 5% to about 15% is desired.

Referring generally to FIG. 1 and particularly to, e.g., FIG. 9, when groove 104, observed in a side elevation view, comprises a side-elevation-view non-linear portion, controller 180 is also configured, based on the first-sensor output and the second-sensor output, to adjust vertical angle β between extrusion axis 112 and plane 183, tangent to groove 104 and perpendicular to a vertical plane, containing extrusion axis 112, so that tool center point 122 follows groove 104 as chassis 110 is moved relative to groove 104. The preceding subject matter of this paragraph characterizes example 9 of the present disclosure, wherein example 9 also includes the subject matter according to any one of examples 5 to 8, above.

Adjusting or maintaining vertical angle β allows radius filler 102 to be positioned within groove 104 even when groove 104 changes in shape, size, and/or direction. For example, if groove 104 undulates vertically, controller 180 adjusts vertical angle β so that tool center point 122 follows groove 104.

Vertical angle β measures from about 1° to about 5°, from about 1° to about 15°, or from about 1° to about 30°. Plane 183 is a virtual reference plane. As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities may be defined.

Referring generally to FIG. 1 and particularly to, e.g., FIG. 9, controller 180 is also configured, based on the first-sensor output and the second-sensor output, to adjust target distance 124 between tool center point 122 and groove 104 so that tool center point 122 follows groove 104 as chassis 110 is moved relative to groove 104. The preceding subject matter of this paragraph characterizes example 10 of the present disclosure, wherein example 10 also includes the subject matter according to example 9, above.

Adjusting and/or maintaining target distance 124 allows radius filler 102 to be positioned within groove 104 even when groove 104 changes in shape, size, and/or direction.

Target distance 124 is measured with respect to an axis (e.g., a central longitudinal axis of groove 104). Target distance 124 is, for example, from about 0.1 cm to about 10 cm, from about 0.2 cm to about 8 cm, or from about 0.3 cm to about 6 cm.

Referring generally to FIG. 1 and particularly to, e.g., FIGS. 4 and 9, when groove 104, observed in a plan-view, comprises a plan-view non-linear portion and when groove 104, observed in a side-elevation-view, comprises a side-elevation-view non-linear portion, controller 180 is also configured, based on the first-sensor output and the second-sensor output, to adjust horizontal angle α between a horizontal projection of extrusion axis 112 and vertical plane 181, tangent to groove 104, to adjust vertical angle β between extrusion axis 112 and plane 183, tangent to groove 104 and perpendicular to a vertical plane, containing extrusion axis 112, and to adjust target distance 124 between tool center point 122 and groove 104 so that tool center point 122 follows groove 104 as chassis 110 is moved relative to groove 104. The preceding subject matter of this paragraph characterizes example 11 of the present disclosure, wherein example 11 also includes the subject matter according to any one of examples 5 to 8, above.

Adjusting or maintaining horizontal angle α allows radius filler 102 to be positioned within groove 104 even when groove 104 changes in shape, size, and/or direction. For example, if groove 104 undulates horizontally, controller 180 adjusts horizontal angle α so that tool center point 122 follows groove 104.

Adjusting or maintaining vertical angle β allows radius filler 102 to be positioned within groove 104 even when groove 104 changes in shape, size, and/or direction. For example, if groove 104 undulates vertically, controller 180 adjusts vertical angle β so that tool center point 122 follows groove 104.

Adjusting and/or maintaining target distance 124 allows radius filler 102 to be positioned within groove 104 even when groove 104 changes in shape, size, and/or direction.

Planes 181 and 183 are virtual reference planes. As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities may be defined.

Referring generally to FIG. 1 and particularly to, e.g., FIGS. 3-5, apparatus 100 further comprises third sensor 170, attached to chassis 110 and configured to provide third-sensor output, representative of fourth geometric characteristics of radius filler 102. The preceding subject matter of this paragraph characterizes example 12 of the present disclosure, wherein example 12 also includes the subject matter according to any one of examples 5 to 11, above.

The third-sensor output verifies the quality of the side surfaces (e.g., the presence of edge and tip tears of radius filler 102 right before it is deposited into groove 104).

The third-sensor output also verifies an extrusion rate of radius filler 102. In one example, third sensor 170 includes one or more profilometers (e.g., one on either side of radius filler 102). In one example, profilometer(s) are LJ-V7000 series profilometer(s) made by Keyence of Itasca, Ill.

Referring generally to FIG. 1 and particularly to, e.g., FIGS. 6A, 6B, and 7, the fourth geometric characteristics of radius filler 102 comprise at least one of tears, voids, or protrusions of a predetermined size in a side surface of radius filler 102 before radius filler 102 is positioned in groove 104. The preceding subject matter of this paragraph characterizes example 13 of the present disclosure, wherein example 13 also includes the subject matter according to example 12, above.

If the quality of the side surface of radius filler 102 is below a predetermined threshold, controller 180 terminates at least a part of the process to prevent propagation of defects along the length of groove 104.

To determine if an edge tear exists, the profilometers seek to identify a void or protrusion in/on radius filler 102. In one example, profilometer(s) are LJ-V7000 series profilometer(s) made by Keyence of Itasca, Ill. Radius filler 102 can be somewhat stiff because it includes carbon fiber. In some cases, radius filler 102 can bulge to the left or the right. The third sensor helps detect and prevent this.

Referring generally to FIG. 1 and particularly to, e.g., FIGS. 3 and 5, apparatus 100 further comprises laser sensor 190, attached to chassis 110 and configured to provide laser-sensor output, representative of extrusion speed at which radius filler 102 is extruded from first means 120. In one example, laser sensor 190 is a LaserSpeed Pro 4500 sensor made by Beta LaserMike, Inc. of Dayton, Ohio. The preceding subject matter of this paragraph characterizes example 14 of the present disclosure, wherein example 14 also includes the subject matter according to example 12 or 13, above.

The speed at which radius filler 102 is extruded is compared to the speed of chassis 110. If the speeds do not match, the speed of chassis 110 is reduced. It is easier to control the speed of chassis 110 rather than the speed of at which radius filler 102 is extruded because the latter can affect the integrity of radius filler 102. More particularly, changing the extrusion speed can affect the viscosity of radius filler 102. Laser sensor 190 is pointed at radius filler 102 as radius filler is extruded. Laser sensor 190 measures speed of extrusion.

Referring generally to FIG. 1 and particularly to, e.g., FIGS. 3 and 5, controller 180 is also configured, based on at least one of the third-sensor output or the laser-sensor output, to control motion speed of chassis 110 with respect to groove 104. The preceding subject matter of this paragraph characterizes example 15 of the present disclosure, wherein example 15 also includes the subject matter according to example 14, above.

Laser-sensor output is used in conjunction with third-sensor output to synchronize a travel speed of chassis 110 with a speed at which radius filler 102 is extruded. It is easier to control the speed of chassis 110 rather than the speed of at which radius filler 102 is extruded because the latter can affect the integrity of radius filler 102. More particularly, changing the extrusion speed can affect the viscosity of radius filler 102. Laser sensor 190 is pointed at radius filler 102 as radius filler is extruded. Laser sensor 190 measures speed of extrusion.

Referring generally to FIG. 1 and particularly to, e.g., FIGS. 3 and 5, controller 180 increases the motion speed of chassis 110 with respect to groove 104 when extrusion speed of radius filler 102 exceeds the motion speed of chassis 110 and decreases the motion speed of chassis 110 when the motion speed of chassis 110 exceeds the extrusion speed of radius filler 102. The preceding subject matter of this paragraph characterizes example 16 of the present disclosure, wherein example 16 also includes the subject matter according to example 15, above.

This can prevent undesirable bending in radius filler 102 that can occur if radius filler 102 is extruded faster than chassis 110 is moving. It is easier to control the speed of chassis 110 rather than the speed of at which radius filler 102 is extruded because the latter can affect the integrity of radius filler 102. More particularly, changing the extrusion speed can affect the viscosity of radius filler 102.

Referring generally to FIG. 1 and particularly to, e.g., FIGS. 3-5 and 8, wherein apparatus 100 further comprises roller 200, attached to first means 120 and configured to be rotated by radius filler 102, extruded by first means 120, and encoder 202, configured to provide encoder output responsive to rotation of roller 200. In one example, encoder 202 is a RM44 magnetic encoder made by Renishaw Company of Komenda, Slovenia. The encoder output is representative of extrusion speed of radius filler 102 by first means 120. The preceding subject matter of this paragraph characterizes example 17 of the present disclosure, wherein example 17 also includes the subject matter according to example 12 or 13, above.

Example 17 is directed to an alternative arrangement, employed to determine the speed at which radius filler 102 is extruded. The roller-encoder system is inherently cheap and reliable.

Roller 200 is in contact with and rolls in response to the contact with radius filler 102 as radius filler 102 is extruded. The number of revolutions of roller 200 is used to determine the length and/or speed of radius filler 102.

Referring generally to FIG. 1 and particularly to, e.g., FIGS. 3-5 and 8, controller 180 is also configured, based on at least one of the third-sensor output or the encoder output, to control motion speed of chassis 110 with respect to groove 104. The preceding subject matter of this paragraph characterizes example 18 of the present disclosure, wherein example 18 also includes the subject matter according to example 17, above.

It is easier to control the speed of chassis 110 rather than the speed of at which radius filler 102 is extruded because the latter can affect the integrity of radius filler 102. More particularly, changing the extrusion speed can affect the viscosity of radius filler 102.

Referring generally to FIG. 1 and particularly to, e.g., FIGS. 3-5 and 8, controller 180 increases the motion speed of chassis 110 with respect to groove 104 when extrusion speed of radius filler 102 exceeds the motion speed of chassis 110 and decreases the motion speed of chassis 110 when the motion speed of chassis 110 exceeds the extrusion speed of radius filler 102. The preceding subject matter of this paragraph characterizes example 19 of the present disclosure, wherein example 19 also includes the subject matter according to example 18, above.

This prevents undesirable bending in radius filler 102 that can occur if radius filler 102 is extruded faster than chassis 110 is moving. It is easier to control the speed of chassis 110 rather than the speed of at which radius filler 102 is extruded because the latter can affect the integrity of radius filler 102. More particularly, changing the extrusion speed can affect the viscosity of radius filler 102.

Referring generally to FIG. 1 and particularly to, e.g., FIGS. 3, 6A, 6B, and 9, first means 120 comprises opening 121, having an adjustable size and exit contour 123 with an adjustable perimeter length. First means 120 is configured to extrude radius filler 102 through opening 121. Tool center point 122 is a centroid of an adjustable-size planar shape, delimited by exit contour 123 of opening 121. The preceding subject matter of this paragraph characterizes example 20 of the present disclosure, wherein example 20 also includes the subject matter according to any one of examples 1 to 19, above.

Opening 121 and exit contour 123 are part of an adjustable nozzle that is used to vary the shape and/or size of radius filler 102 as radius filler 102 is extruded. In an alternative implementation, exit contour 123 is part of a movable gate that is used to vary the shape and/or size of radius filler 102 as radius filler 102 is extruded. Tool center point 122 is defined to provide a reference point for apparatus 100. This allows dimensions of radius filler 102 to match corresponding dimensions of groove 104.

Referring generally to FIG. 1 and particularly to, e.g., FIG. 5, apparatus 100 further comprises fourth means 145 for gripping and holding one end of radius filler 102. The preceding subject matter of this paragraph characterizes example 21 of the present disclosure, wherein example 21 also includes the subject matter according to any one of examples 1 to 20, above.

Radius filler 102 is gripped to facilitate introducing radius filler 102 into groove 104 at the beginning of the process. In one example, fourth means 145 includes a hold-down clamp or a gripper (e.g., a vise having a plurality of jaws) that is configured to retain one end of radius filler 102 relative to groove 104. In another example, fourth means 145 is or includes an adhesive. Fourth means 145 operates such that when apparatus 100 begins to move, one end of radius filler 102 remains stationary relative to groove 104. Fourth means 145 is controlled by controller 180.

Referring generally to FIG. 1 and particularly to, e.g., FIG. 5, fourth means 145 is configured to initially grip the one end of radius filler 102 after radius filler 102 is extruded from first means 120, but before tool center point 122 is advanced along groove 104. The preceding subject matter of this paragraph characterizes example 22 of the present disclosure, wherein example 22 also includes the subject matter according to example 21, above.

Radius filler 102 is gripped to facilitate introducing radius filler 102 into groove 104 at the beginning of the process. Fourth means 145 operates such that when apparatus 100 begins to move, one end of radius filler 102 remains stationary relative to groove 104.

Referring generally to FIG. 1 and particularly to, e.g., FIG. 5, fourth means 145 is configured to continue to grip the one end of radius filler 102 while tool center point 122 is advanced along groove 104. The preceding subject matter of this paragraph characterizes example 23 of the present disclosure, wherein example 23 also includes the subject matter according to example 22, above.

Radius filler 102 is gripped to facilitate introducing radius filler 102 into groove 104 at the beginning of the process. Fourth means 145 continues to grip radius filler 102 to prevent radius filler 102 from sliding within groove 104.

Referring generally to FIG. 1 and particularly to, e.g., FIG. 5, the one end of radius filler 102 is initially gripped by fourth means 145 prior to radius filler 102 being introduced into groove 104. The preceding subject matter of this paragraph characterizes example 24 of the present disclosure, wherein example 24 also includes the subject matter according to any one of examples 21 to 23, above.

Radius filler 102 is gripped to facilitate introducing radius filler 102 into groove 104 at the beginning of the process. Fourth means 145 operates such that when apparatus 100 begins to move, one end of radius filler 102 remains stationary relative to groove 104.

Referring generally to FIG. 1 and particularly to, e.g., FIG. 5, radius filler 102 is gripped by fourth means 145 prior to chassis 110 moving relative to groove 104. The preceding subject matter of this paragraph characterizes example 25 of the present disclosure, wherein example 25 also includes the subject matter according to any one of examples 21 to 24, above.

Radius filler 102 is gripped to facilitate introducing radius filler 102 into groove 104 at the beginning of the process. Fourth means 145 operates such that when apparatus 100 begins to move, one end of radius filler 102 remains stationary relative to groove 104.

Referring generally to FIG. 1 and particularly to, e.g., FIGS. 2-10B, method 1000 of depositing radius filler 102, made of a homogeneous material, into groove 104, formed in workpiece 106 and having a length is disclosed. Method 1000 comprises (block 1002) moving, relative groove 104, tool center point 122, associated with first means 120 for extruding radius filler 102 along extrusion axis 112. Method 1000 also comprises (block 1004) using first sensor 150 that is attached to chassis 110, supporting first means 120, to provide first-sensor output, representative of first geometric characteristics of groove 104 along at least a portion of the length of groove 104 before radius filler 102 is deposited into at least the portion of the length of groove 104. Additionally, method 1000 comprises (block 1006) causing first means 120 to extrude radius filler 102 along extrusion axis 112 while controlling second geometric characteristics of radius filler 102 based on the first geometric characteristics. Method 1000 further comprises (block 1032) at least partially compacting radius filler 102, extruded by first means 120, in groove 104. The preceding subject matter of this paragraph characterizes example 26 of the present disclosure.

Method 1000 relates to an in-situ radius-filler manufacturing and deposition technique, which addresses problems, associated with excessive manufacturing lead time, high cost, as well as complex fabrication, material-handling, and large-footprint requirements of conventional radius-filler installations. The method is used to produce, in-situ, and install radius filler 102, having the desired length and a cross-sectional shape, which is dynamically adjusted to correspond to the cross-sectional shape of groove 104, into which radius filler 102 is deposited.

In one example, first means 120 is an adjustable nozzle that extrudes radius filler 102. The adjustable nozzle is configured to vary the size of its opening to control the cross-sectional area of radius filler 102 as radius filler 102 is being extruded. The adjustable nozzle comprises a gate, configured to move across the opening to selectively occlude the opening to adjust a profile of radius filler 102 as radius filler 102 is being extruded.

Tool center point 122 is a reference point that is fixed with respect to first means 120. In one implementation, tool center point 122 is at the outlet of first means 120, through which radius filler 102 is extruded. First sensor 150 leads first means 120 and measures the shape, cross-sectional area, and/or path of groove 104. The first-sensor output is used to control (e.g., maintain or modify) the second geometric characteristics of radius filler 102, which include a cross-sectional shape of radius filler 102, a speed at which radius filler 102 is extruded, or the like.

In one example, radius filler 102 is a stringer noodle, made of a thermoset resin that is reinforced with chopped fibers. In at least one implementation, radius filler 102 is not laminated. Radius filler 102 can have a length as long as groove 104, which can be up to about 110 feet or even longer. In one example, radius filler 102 and workpiece 106 is co-cured together after radius filler 102 is deposited in groove 104.

Groove 104 can be a uniform groove. For example, groove 104 can be in a straight line and/or have a constant cross-sectional area along the length of groove 104. In another implementation, groove 104 can be a non-uniform groove. For example, groove 104 can bend, wind, or zig-sag in a horizontal plane or a vertical plane and/or the cross-sectional area can vary along the length of groove 104.

When the process begins, apparatus 100 is positioned at a predetermined location such that one end of groove 104 is within the field of view of first sensor 150. Once apparatus 100 is in the starting position, the first-sensor output is used to adjust or maintain the position of apparatus 100 (e.g., first means 120) relative to groove 104. More particularly, first-sensor output is used to guide the position of apparatus 100 by continuously taking X, Y, Z measurements and making adjustments based upon horizontal angle α, vertical angle β, and target distance 124 between first means 120 and groove 104.

Referring generally to FIG. 1 and particularly to, e.g., FIGS. 6A, 6B, 7, 10A, and 10B, according to method 1000, the first geometric characteristics of groove 104 comprise a cross-sectional area of groove 104. The preceding subject matter of this paragraph characterizes example 27 of the present disclosure, wherein example 27 also includes the subject matter according to example 26, above.

In some cases, cross-sectional area of groove 104 varies along groove 104. By monitoring such variations, the second geometric characteristics of the radius filler 102 can be dynamically adjusted to match the variations in the groove 104. For example, the size of the opening of the adjustable nozzle (first means 120) is adjusted as the gate moves across the opening of the nozzle to dynamically adjust the second geometric characteristics of radius filler 102.

Referring generally to FIG. 1 and particularly to, e.g., FIGS. 6A, 6B, 7, 10A, and 10B, according to method 1000, the second geometric characteristics of radius filler 102 comprise a cross-sectional area of radius filler 102. The preceding subject matter of this paragraph characterizes example 28 of the present disclosure, wherein example 28 also includes the subject matter according to example 26 or 27, above.

In some cases, the cross-sectional area of groove 104 varies along groove 104. By monitoring such variations, the second geometric characteristics of the radius filler 102 can be dynamically adjusted to match the variations in the groove 104. For example, the size of the opening of the adjustable nozzle (first means 120) is adjusted as the gate moves across the opening to dynamically adjust the second geometric characteristics of radius filler 102.

Referring generally to FIG. 1 and particularly to, e.g., FIGS. 3, 6A, 6B, 9, 10A, and 10B, according to method 1000, (block 1008) causing first means 120 to extrude radius filler 102 comprises extruding radius filler 102 through opening 121 in first means 120. Opening 121 has an adjustable size and exit contour 123 with an adjustable length. Tool center point 122 is a centroid of an adjustable-size planar shape, delimited by exit contour 123 of opening 121. The preceding subject matter of this paragraph characterizes example 29 of the present disclosure, wherein example 29 also includes the subject matter according to any one of examples 26 to 28, above.

Opening 121 and exit contour 123 are part of an adjustable nozzle that is used to vary the shape and/or size of radius filler 102 as radius filler 102 is extruded. In an alternative implementation, exit contour 123 is part of a movable gate that is used to vary the shape and/or size of radius filler 102 as radius filler 102 is extruded. Tool center point 122 is defined to provide a reference point for apparatus 100. This allows dimensions of radius filler 102 to match corresponding dimensions of groove 104.

Referring generally to FIG. 1 and particularly to, e.g., FIGS. 4, 10A, and 10B, according to method 1000, when groove 104, observed in a plan-view, comprises a non-linear portion, method 1000 further comprises, (block 1016) based on the first-sensor output, adjusting horizontal angle α between a horizontal projection of extrusion axis 112 and vertical plane 181, tangent to groove 104, so that tool center point 122 follows groove 104 as chassis 110 is moved relative to groove 104. The preceding subject matter of this paragraph characterizes example 30 of the present disclosure, wherein example 30 also includes the subject matter according to any one of examples 26 to 29, above.

Adjusting or maintaining horizontal angle α allows radius filler 102 to be positioned within groove 104 even when groove 104 changes in shape, size, and/or direction. For example, if groove 104 undulates horizontally, controller 180 adjusts horizontal angle α so that tool center point 122 follows groove 104.

The first-sensor output is also used to calculate pitch offset (e.g., angular orientation change of first means 120 to maintain a predetermined optimum target distance 124 and horizontal angle α between first means 120 and groove 104). In at least one implementation, the first-sensor output is used in conjunction with the second-sensor output to accomplish this.

Vertical plane 181 is a virtual reference plane. As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities may be defined.

In one implementation, the point of tangency is the intersection of extrusion axis 112 and the medial (central) longitudinal axis of groove 104. In another implementation, the point of tangency is the intersection of extrusion axis 112 and another axis, such as a central longitudinal axis of groove 104.

Referring generally to FIG. 1 and particularly to, e.g., FIGS. 3-7, 10A, and 10B, method 1000 also comprises (block 1034) determining how much radius filler 102 overfills or underfills groove 104 based on a second-sensor output of second sensor 160 that is attached to chassis 110. According to method 1000, the second-sensor output is representative of third geometric characteristics of radius filler 102 in groove 104 along at least a portion of the length of groove 104. The preceding subject matter of this paragraph characterizes example 31 of the present disclosure, wherein example 31 also includes the subject matter according to any one of examples 26 to 30, above.

Images from the first-sensor output are compared with images from the second-sensor output to ensure that radius filler 102 properly fills or slightly overfills groove 104.

Second sensor 160 is used for quality assurance. In one example, second sensor 160 includes one or more profilometers that lag third means 140. In one example, profilometer(s) are LJ-V7000 series profilometer(s) made by Keyence of Itasca, Ill. The third geometric characteristics include a crown height of radius filler 102 (e.g., height of the radius filler 102 relative to groove 104) after radius filler 102 is deposited in groove 104. Additionally or alternatively, the third geometric characteristics include a width of radius filler 102 after radius filler 102 is deposited in groove 104. Additionally or alternatively, the third geometric characteristics include overfill or underfill cross-sectional area.

Referring generally to FIG. 1 and particularly to, e.g., FIGS. 3-7, 10A, and 10B, according to method 1000, determining how much radius filler 102 overfills or underfills groove 104 comprises (block 1036) comparing the first-sensor output and the second-sensor output. The preceding subject matter of this paragraph characterizes example 32 of the present disclosure, wherein example 32 also includes the subject matter according to example 31, above.

Images from the first-sensor output is compared with images from the second-sensor output to ensure that radius filler 102 properly fills or slightly overfills groove 104.

The comparison includes overlaying the second-sensor data over the first-sensor data. In one implementation, an overfill from about 1% to about 20% or from about 5% to about 15% is desired.

Referring generally to FIG. 1 and particularly to, e.g., FIGS. 6A, 6B, 7, 10A, and 10B, according to method 1000, the third geometric characteristics comprise at least one of: (1) a difference between a maximum width of groove 104 and a maximum width of radius filler 102 after radius filler 102 is compacted in groove 104; or (2) a difference between a height of groove 104 and a height of radius filler 102 after radius filler 102 is compacted in groove 104. The preceding subject matter of this paragraph characterizes example 33 of the present disclosure, wherein example 33 also includes the subject matter according to example 31 or 32, above.

Images from the first-sensor output are compared with images from the second-sensor output to ensure that radius filler 102 properly fills or slightly overfills groove 104.

The third geometric characteristics include a crown height of radius filler 102 (e.g., height of radius filler 102 relative to the groove 104) after radius filler 102 is deposited in groove 104. Additionally or alternatively, the third geometric characteristics include a width of radius filler 102 after radius filler 102 is deposited in groove 104. Additionally or alternatively, the third geometric characteristics include overfill or underfill cross-sectional area.

Referring generally to FIG. 1 and particularly to, e.g., FIGS. 5-7, 10A, and 10B, method 1000 also comprises (block 1038) based on the second-sensor output, stopping movement of chassis 110, preventing radius filler 102 from being extruded, or both stopping the movement of chassis 110 and preventing radius filler 102 from being extruded responsive to detecting a defect in at least one of workpiece 106, groove 104, or radius filler 102. The preceding subject matter of this paragraph characterizes example 34 of the present disclosure, wherein example 34 also includes the subject matter according to any one of examples 31 to 33, above.

If a defect is detected, controller 180 terminates at least a part of the process so that the defect can be analyzed and/or not propagated along the length of groove 104.

Referring generally to FIG. 1 and particularly to, e.g., FIGS. 9, 10A, and 10B, when groove 104, observed in a side elevation view, comprises a non-linear portion, method 1000 further comprises, (block 1018) based on the first-sensor output and the second-sensor output, adjusting vertical angle β between extrusion axis 112 and plane 183, tangent to groove 104 and perpendicular to a vertical plane, containing extrusion axis 112, so that tool center point 122 follows groove 104 as chassis 110 is moved relative to groove 104. The preceding subject matter of this paragraph characterizes example 35 of the present disclosure, wherein example 35 also includes the subject matter according to any one of examples 31 to 34, above.

Adjusting or maintaining vertical angle β allows radius filler 102 to be positioned within groove 104 even when groove 104 changes in shape, size, and/or direction. For example, if groove 104 undulates vertically, controller 180 adjusts vertical angle β so that tool center point 122 follows groove 104.

Plane 183 is a virtual reference plane. As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities may be defined.

Referring generally to FIG. 1 and particularly to, e.g., FIGS. 9, 10A, and 10B, method 1000 also comprises, (block 1020) based on the first-sensor output and the second-sensor output, adjusting target distance 124 between tool center point 122 and groove 104 so that tool center point 122 follows groove 104 as chassis 110 is moved relative to groove 104. The preceding subject matter of this paragraph characterizes example 36 of the present disclosure, wherein example 36 also includes the subject matter according to example 35, above.

Adjusting or maintaining target distance 124 allows radius filler 102 to be positioned within groove 104 even when groove 104 changes in shape, size, and/or direction.

Target distance 124 is measured with respect to an axis (e.g., a central longitudinal axis of groove 104).

Referring generally to FIG. 1 and particularly to, e.g., FIGS. 4, 9, 10A, and 10B, when groove 104, observed in a plan view, comprises a non-linear portion and when groove 104, observed in a side-elevation-view, comprises a non-linear portion, the method further comprises, based on the first-sensor output and the second-sensor output: (block 1016) adjusting horizontal angle α between a horizontal projection of extrusion axis 112 and vertical plane 181, tangent to groove 104; (block 1018) adjusting vertical angle β between extrusion axis 112 and plane 183, tangent to groove 104 and perpendicular to vertical plane 181, containing extrusion axis 112; and (block 1020) adjusting target distance 124 between tool center point 122 and groove 104 so that tool center point 122 follows groove 104 as chassis 110 is moved relative to groove 104. The preceding subject matter of this paragraph characterizes example 37 of the present disclosure, wherein example 37 also includes the subject matter according to example 31, above.

Adjusting or maintaining horizontal angle α allows radius filler 102 to be positioned within groove 104 even when groove 104 changes in shape, size, and/or direction. For example, if groove 104 undulates horizontally, controller 180 adjusts horizontal angle α so that tool center point 122 follows groove 104.

Adjusting or maintaining vertical angle β allows radius filler 102 to be positioned within groove 104 even when groove 104 changes in shape, size, and/or direction. For example, if groove 104 undulates vertically, controller 180 adjusts vertical angle β so that tool center point 122 follows groove 104.

Adjusting and/or maintaining target distance 124 allows radius filler 102 to be positioned within groove 104 even when groove 104 changes in shape, size, and/or direction.

Planes 181 and 183 are virtual reference planes. As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities may be defined.

Referring generally to FIG. 1 and particularly to, e.g., FIGS. 3-7, 10A, and 10B, method 1000 further comprises (block 1022) determining quality of a side surface of radius filler 102 before radius filler 102 is positioned in groove 104 based on a third-sensor output from third sensor 170 that is attached to chassis 110, and wherein the third-sensor output is representative of fourth geometric characteristics of radius filler 102. The preceding subject matter of this paragraph characterizes example 38 of the present disclosure, wherein example 38 also includes the subject matter according to any one of examples 31 to 37, above.

If the quality of the side surface is below a predetermined threshold, controller 180 stops part or all of the process so that the quality can be analyzed and defects are not propagated along the length of groove 104.

The third-sensor output also verifies an extrusion rate of radius filler 102. Third sensor 170 includes one or more profilometers (e.g., one on either side of radius filler 102). In one example, profilometer(s) are LJ-V7000 series profilometer(s) made by Keyence of Itasca, Ill.

Referring generally to FIG. 1 and particularly to, e.g., FIGS. 6A, 6B, 7, 10A, and 10B, according to method 1000, the fourth geometric characteristics of radius filler 102 comprise at least one of tears, voids, or protrusions in the side surface of radius filler 102 before radius filler 102 is positioned in groove 104. The preceding subject matter of this paragraph characterizes example 39 of the present disclosure, wherein example 39 also includes the subject matter according to example 38, above.

If the quality of the side surface is below a predetermined threshold, controller 180 stops part or all of the process so that the quality can be analyzed and defects are not propagated along the length of groove 104.

To determine if an edge tear exists, profilometers seek to identify a void or protrusion in/on radius filler 102. Radius filler 102 can be somewhat stiff because it includes carbon fiber. In some cases, radius filler 102 can bulge to the left or the right. The third-sensor helps detect and prevent this.

Referring generally to FIG. 1 and particularly to, e.g., FIGS. 3, 5, 10A, and 10B, method 1000 further comprises (block 1024) determining extrusion speed, at which radius filler 102 is extruded from first means 120 along extrusion axis 112, based on a laser-sensor output of laser sensor 190 that is attached to chassis 110. The preceding subject matter of this paragraph characterizes example 40 of the present disclosure, wherein example 40 also includes the subject matter according to example 38 or 39, above.

The speed at which radius filler 102 is extruded is compared to the speed of chassis 110. If the speeds do not match, the speed of chassis 110 is reduced. It is easier to control the speed of chassis 110 rather than the speed of at which radius filler 102 is extruded because the latter can affect the integrity of radius filler 102. More particularly, changing the extrusion speed can affect the viscosity of radius filler 102. Laser sensor 190 is pointed at radius filler 102 as radius filler is extruded. Laser sensor 190 measures speed of extrusion.

Referring generally to FIG. 1 and particularly to, e.g., FIGS. 3, 5, 10A, and 10B, method 1000 further comprises (block 1026) varying motion speed of chassis 110 relative to groove 104 based on at least one of the third-sensor output or the laser-sensor output. The preceding subject matter of this paragraph characterizes example 41 of the present disclosure, wherein example 41 also includes the subject matter according to example 40, above.

The speed at which radius filler 102 is extruded is compared to the speed of chassis 110. If the speeds do not match, the speed of chassis 110 is reduced. It is easier to control the speed of chassis 110 rather than the speed of at which radius filler 102 is extruded because the latter can affect the integrity of radius filler 102. More particularly, changing the extrusion speed can affect the viscosity of radius filler 102. Laser sensor 190 is pointed at radius filler 102 as radius filler is extruded. Laser sensor 190 measures speed of extrusion.

Referring generally to FIG. 1 and particularly to, e.g., FIGS. 5, 8, 10A, and 10B, according to method 1000, (block 1028) roller 200, attached to first means 120, is configured to rotationally contact radius filler 102 as radius filler 102 is extruded from first means 120 along extrusion axis 112. Encoder output, representative of extrusion speed at which radius filler 102 is extruded from first means 120 along extrusion axis 112, is generated responsive to roller 200 rotating. The preceding subject matter of this paragraph characterizes example 42 of the present disclosure, wherein example 42 also includes the subject matter according to any one of examples 38 to 41, above.

Example 42 is directed to an alternative arrangement, employed to determine the speed at which radius filler 102 is extruded. The roller-encoder system is inherently cheap and reliable.

Roller 200 is in contact with and rolls in response to the contact with radius filler 102 as radius filler 102 is extruded. The number of revolutions of roller 200 is used to determine the length and/or speed of radius filler 102.

Referring generally to FIG. 1 and particularly to, e.g., FIGS. 5, 8, 10A, and 10B, method 1000 further comprises (block 1030) varying motion speed of chassis 110 relative to groove 104 based on at least one of the third-sensor output or the encoder output. The preceding subject matter of this paragraph characterizes example 43 of the present disclosure, wherein example 43 also includes the subject matter according to example 42, above.

The speed at which radius filler 102 is extruded is compared to the speed of chassis 110. If the speeds do not match, the speed of chassis 110 is reduced. It is easier to control the speed of chassis 110 rather than the speed of at which radius filler 102 is extruded because the latter can affect the integrity of radius filler 102. More particularly, changing the extrusion speed can affect the viscosity of radius filler 102.

Referring generally to FIG. 1 and particularly to, e.g., FIGS. 5, 10A, and 10B, method 1000 further comprises (block 1010) gripping and holding one end of radius filler 102. The preceding subject matter of this paragraph characterizes example 44 of the present disclosure, wherein example 44 also includes the subject matter according to any one of examples 26 to 43, above.

Radius filler 102 is gripped to facilitate introducing radius filler 102 into groove 104 at the beginning of the process. In one example, fourth means 145 includes a hold-down clamp or a gripper (e.g., a vise having a plurality of jaws) that is configured to retain one end of radius filler 102 relative to groove 104. In another example, fourth means 145 is or includes an adhesive. Fourth means 145 operates such that when apparatus 100 begins to move, one end of radius filler 102 remains stationary relative to groove 104. Fourth means 145 is controlled by controller 180.

Referring generally to FIG. 1 and particularly to, e.g., FIGS. 5, 10A, and 10B, method 1000 further comprises (block 1012) gripping and holding one end of radius filler 102 after radius filler 102 is extruded from first means 120, but before tool center point 122 is advanced along groove 104. The preceding subject matter of this paragraph characterizes example 45 of the present disclosure, wherein example 45 also includes the subject matter according to any one of examples 26 to 43, above.

Radius filler 102 is gripped to facilitate introducing radius filler 102 into groove 104 at the beginning of the process. Fourth means 145 operates such that when apparatus 100 begins to move, one end of radius filler 102 remains stationary relative to groove 104.

Referring generally to FIG. 1 and particularly to, e.g., FIGS. 5, 10A, and 10B, method 1000 further comprises (block 1014) continuing to grip the one end of radius filler 102 while tool center point 122 is advanced along groove 104. The preceding subject matter of this paragraph characterizes example 46 of the present disclosure, wherein example 46 also includes the subject matter according to example 45, above.

Radius filler 102 is gripped to facilitate introducing radius filler 102 into groove 104 at the beginning of the process. Fourth means 145 operates such that when apparatus 100 begins to move, one end of radius filler 102 remains stationary relative to groove 104.

Referring generally to FIG. 1 and particularly to, e.g., FIGS. 5, 10A, and 10B, according to method 1000, radius filler 102 is gripped before radius filler 102 is introduced into groove 104. The preceding subject matter of this paragraph characterizes example 47 of the present disclosure, wherein example 47 also includes the subject matter according to example 45 or 46, above.

Radius filler 102 is gripped to facilitate introducing radius filler 102 into groove 104 at the beginning of the process. Fourth means 145 operates such that when apparatus 100 begins to move, one end of radius filler 102 remains stationary relative to groove 104.

Referring generally to FIG. 1 and particularly to, e.g., FIGS. 5, 10A, and 10B, according to method 1000, radius filler 102 is gripped before chassis 110 is moved relative to groove 104. The preceding subject matter of this paragraph characterizes example 48 of the present disclosure, wherein example 48 also includes the subject matter according to any one of examples 45 to 47, above.

Radius filler 102 is gripped to facilitate introducing radius filler 102 into groove 104 at the beginning of the process. Fourth means 145 operates such that when apparatus 100 begins to move, one end of radius filler 102 remains stationary relative to groove 104.

Examples of the present disclosure may be described in the context of aircraft manufacturing and service method 1100 as shown in FIG. 11 and aircraft 1102 as shown in FIG. 12. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An apparatus for depositing a radius filler, made of a homogeneous material, into a groove, formed in a workpiece and having a length, the apparatus comprising:
    a chassis, movable relative to the groove;
    first means for extruding the radius filler along an extrusion axis;
    a tool center point, associated with the first means;
    second means for providing the homogeneous material to the first means, wherein the second means is attached to the chassis and the first means is attached to the second means;
    third means for compacting the radius filler in the groove, wherein the third means is attached to the chassis;
    a first sensor, attached to the chassis and configured to provide a first-sensor output, representative of first geometric characteristics of the groove along at least a portion of the length of the groove before the radius filler is deposited into at least the portion of the length of the groove;
    a second sensor, attached to the chassis and configured to provide a second-sensor output, representative of third geometric characteristics of the radius filler in the groove along at least a portion of the length of the groove after the third means compacts the radius filler in the groove;
    a third sensor, attached to the chassis and configured to provide a third-sensor output, representative of fourth geometric characteristics of the radius filler before the radius filler is deposited into the groove; and
    a controller, operatively coupled to the first means, the second means, and the first sensor and wherein:
        based on the first-sensor output, the controller is configured to determine the first geometric characteristics of the groove and,
        based on the first geometric characteristics, the controller is configured to control second geometric characteristics of the radius filler, extruded by the first means, as the tool center point is moved relative to the groove.

2. The apparatus according to claim 1, wherein, when the groove, observed in a plan view, comprises a plan-view non-linear portion, the controller is also configured, based on the first-sensor output, to adjust a horizontal angle between a horizontal projection of the extrusion axis and a vertical plane, tangent to the groove, so that the tool center point follows the groove as the chassis is moved relative to the groove.

3. The apparatus according to claim 1, wherein the controller is also configured, by making a comparison between the first-sensor output and the second-sensor output, to determine how much the radius filler overfills or underfills the groove.

4. The apparatus according to claim 3, wherein the controller is also configured, responsive to a fault condition, corresponding to the radius filler overfilling or underfilling the groove by a predetermined amount and identified by making the comparison between the first-sensor output and the second-sensor output, to at least one of:
    discontinue movement of the chassis relative to the groove and extrusion of the radius filler along the extrusion axis; or
    store a location of the fault condition along the groove.

5. The apparatus according to claim 1, wherein, when the groove, observed in a side elevation view, comprises a side-elevation-view non-linear portion, the controller is also configured, based on the first-sensor output and the second-sensor output, to adjust a vertical angle between the extrusion axis and a plane (183), tangent to the groove and perpendicular to a vertical plane, containing the extrusion axis, so that the tool center point follows the groove as the chassis is moved relative to the groove.

6. The apparatus according to claim 5, wherein the controller is also configured, based on the first-sensor output and the second-sensor output, to adjust a target distance between the tool center point and the groove so that the tool center point follows the groove as the chassis is moved relative to the groove.

7. The apparatus according to claim 1, further comprising a laser sensor (190), attached to the chassis and configured to provide laser-sensor output, representative of extrusion speed at which the radius filler is extruded from the first means.

8. The apparatus according to claim 1, further comprising:
   a roller (200), attached to the chassis and configured to be rotated by the radius filler, extruded by the first means; and
   an encoder (202), configured to provide encoder output responsive to rotation of the roller (200), and
   wherein the encoder output is representative of extrusion speed of the radius filler by the first means.

9. The apparatus according to claim 1, further comprising fourth means (145) for gripping and holding one end of the radius filler.

10. A method of using the apparatus according to claim 1 to deposit the radius filler into the groove, formed in the workpiece, the method comprising steps of:
   moving, relative the groove, the tool center point, associated with the first means for extruding the radius filler along the extrusion axis;
   using the first sensor that is attached to the chassis, supporting the first means, to provide the first-sensor output, representative of the first geometric characteristics of the groove along at least a portion of the length of the groove before the radius filler is deposited into at least the portion of the length of the groove;
   using the second sensor that is attached to the chassis, supporting the second means, to provide the second-sensor output, representative of the third geometric characteristics of the radius filler in the groove along at least a portion of the length of the groove after the third means compacts the radius filler in the groove;
   using the third sensor that is attached to the chassis, supporting the third means, to provide the third-sensor output, representative of the fourth geometric characteristics of the radius filler before the radius filler is deposited into the groove;
   causing the first means to extrude the radius filler along the extrusion axis while controlling the second geometric characteristics of the radius filler based on the first geometric characteristics; and
   at least partially compacting the radius filler, extruded by the first means, in the groove.

11. The method according to claim 10, wherein:
   causing the first means to extrude the radius filler comprises extruding the radius filler through an opening in the first means,
   the opening has an adjustable size and an exit contour with an adjustable length, and
   the tool center point is a centroid of an adjustable-size planar shape, delimited by the exit contour of the opening.

12. The method according to claim 10, wherein, when the groove, observed in a plan-view, comprises a non-linear portion, the method further comprises, based on the first-sensor output, adjusting a horizontal angle between a horizontal projection of the extrusion axis and a vertical plane, tangent to the groove, so that the tool center point follows the groove as the chassis is moved relative to the groove.

13. The method according to claim 10, further comprising a step of determining how much the radius filler overfills or underfills the groove based on the second-sensor output of the second sensor that is attached to the chassis, and wherein the second-sensor output is representative of the third geometric characteristics of the radius filler in the groove along at least a portion of the length of the groove.

14. The method according to claim 13, wherein the step of determining how much the radius filler overfills or underfills the groove comprises comparing the first-sensor output and the second-sensor output.

15. The method according to claim 13, further comprising, based on the second-sensor output, stopping movement of the chassis, preventing the radius filler from being extruded, or both stopping the movement of the chassis and preventing the radius filler from being extruded responsive to detecting a defect in at least one of the workpiece, the groove, or the radius filler.

16. The method according to claim 13, wherein, when the groove, observed in a side elevation view, comprises a non-linear portion, the method further comprises, based on the first-sensor output and the second-sensor output, adjusting a vertical angle between the extrusion axis and a plane, tangent to the groove and perpendicular to a vertical plane, containing the extrusion axis, so that the tool center point follows the groove as the chassis is moved relative to the groove.

17. The method according to claim 16, further comprising, based on the first-sensor output and the second-sensor output, adjusting a target distance between the tool center point and the groove so that the tool center point follows the groove as the chassis is moved relative to the groove.

18. The method according to claim 13, further comprising determining quality of a side surface of the radius filler before the radius filler is positioned in the groove based on the third-sensor output from the third sensor that is attached to the chassis, wherein the third-sensor output is representative of the fourth geometric characteristics of the radius filler.

19. The apparatus according to claim 1, wherein the fourth geometric characteristics comprise a quality of a side surface of the radius filler.

20. The apparatus according to claim 1, wherein the fourth geometric characteristics comprise a tear, a void, a protrusion, or a combination thereof.

* * * * *